(12) United States Patent
Amini Horri et al.

(10) Patent No.: US 12,391,547 B2
(45) Date of Patent: Aug. 19, 2025

(54) CONTINUOUS PROCESS FOR SUSTAINABLE PRODUCTION OF HYDROGEN

(71) Applicant: UNIVERSITY OF SURREY, Guildford (GB)

(72) Inventors: Bahman Amini Horri, Guildford (GB); Sai Gu, Guildford (GB)

(73) Assignee: UNIVERSITY OF SURREY, Guildford (GB)

(*) Notice: Subject to any disclaimer, the term of this patent is extended or adjusted under 35 U.S.C. 154(b) by 821 days.

(21) Appl. No.: 17/260,991

(22) PCT Filed: Jul. 18, 2019

(86) PCT No.: PCT/GB2019/052002
§ 371 (c)(1),
(2) Date: Jan. 15, 2021

(87) PCT Pub. No.: WO2020/016580
PCT Pub. Date: Jan. 23, 2020

(65) Prior Publication Data
US 2021/0261407 A1    Aug. 26, 2021

(30) Foreign Application Priority Data
Jul. 19, 2018 (GB) ................... 1811785

(51) Int. Cl.
*C01B 3/10* (2006.01)
*B01J 19/24* (2006.01)
(Continued)

(52) U.S. Cl.
CPC ........... *C01B 3/105* (2013.01); *B01J 19/2465* (2013.01); *C01G 9/02* (2013.01); *C25B 1/04* (2013.01);
(Continued)

(58) Field of Classification Search
CPC ........... C01B 3/105; C01B 3/10; C01B 13/20; B01J 19/2465; C01G 9/02; C01G 9/00;
(Continued)

(56) References Cited

U.S. PATENT DOCUMENTS 3,928,550 A * 12/1975 Seitzer .................... C01B 3/105
                                                           423/657
4,332,650 A    6/1982 Foh et al.
(Continued)

FOREIGN PATENT DOCUMENTS

CN            1505591 A    6/2004
CN        101746724 A *    6/2010
(Continued)

OTHER PUBLICATIONS

Esposito, Joule 2017, 1, 651-658 (Year: 2017).*
(Continued)

*Primary Examiner* — Sally A Merkling
*Assistant Examiner* — Jordan W Taylor
(74) *Attorney, Agent, or Firm* — Squire Patton Boggs (US) LLP

(57) ABSTRACT

The disclosure provides a method of producing hydrogen. The method comprises conducting a thermochemical reaction by contacting a metal, or an alloy thereof, with steam to produce a metal oxide and/or a metal hydroxide and hydrogen. The method then comprises contacting the metal oxide and/or the metal hydroxide produced in the thermochemical reaction with water or a basic aqueous solution to produce a solution comprising a metal ion. Finally, the method comprises conducting an electrochemical reaction by applying a voltage across an anode and a cathode, whereby at least a portion of the cathode contacts the solution comprising the metal ion, to produce hydrogen, oxygen and the metal, or the alloy thereof.

18 Claims, 9 Drawing Sheets

(51) Int. Cl.
*C01G 9/02* (2006.01)
*C25B 1/04* (2021.01)
*C25B 9/17* (2021.01)
*C25C 1/14* (2006.01)
*C25C 1/16* (2006.01)
*C25C 7/00* (2006.01)

(52) U.S. Cl.
CPC .................. *C25B 9/17* (2021.01); *C25C 1/14* (2013.01); *C25C 1/16* (2013.01); *C25C 7/00* (2013.01)

(58) Field of Classification Search
CPC .... C01G 1/02; C25B 1/04; C25B 9/17; C25C 1/14; C25C 1/16; C25C 1/00; C25C 7/00; Y02E 60/36; C01D 1/02
See application file for complete search history.

(56) References Cited

U.S. PATENT DOCUMENTS

| | | | | |
|---|---|---|---|---|
| 8,617,766 | B2 * | 12/2013 | Bienvenu | H01M 12/08 |
| | | | | 429/57 |
| 11,208,728 | B2 | 12/2021 | Krasovic | |
| 2014/0072836 | A1 * | 3/2014 | Mills | H01M 4/8626 |
| | | | | 429/422 |
| 2017/0321332 | A1 * | 11/2017 | Gupta | C25B 1/04 |

FOREIGN PATENT DOCUMENTS

| | | | |
|---|---|---|---|
| CN | 103703166 | | 4/2014 |
| EP | 2898117 | B1 | 10/2017 |
| JP | 2001270701 | A * | 10/2001 |
| JP | 2005-255505 | A | 9/2005 |
| JP | 2007-145686 | A | 6/2007 |
| JP | 2016-527396 | A | 1/2015 |
| JP | 2015-173114 | A | 10/2015 |
| JP | 2015-535825 | A | 12/2015 |
| JP | 2017-155315 | A | 9/2017 |
| JP | 2017190275 | A * | 10/2017 |
| WO | WO 2002/070403 | A1 | 9/2002 |
| WO | WO 2010/096392 | A2 | 8/2010 |
| WO | WO 2013/054340 | A2 | 4/2013 |
| WO | WO 2013/181261 | A1 | 12/2013 |
| WO | WO 2013/181261 | A2 | 12/2013 |
| WO | WO 2014/046791 | A1 | 3/2014 |
| WO | WO-2017115269 | A1 * | 7/2017 ............... C25B 1/00 |

OTHER PUBLICATIONS

Tsuda JP2017190275A English Translation (Year: 2017).*
Xiao et al. Renewable Energy 2012, 41, 1-12 (Year: 2012).*
Haynes 2014 CRC handbook of chemistry and physics, Appendix H (Year: 2014).*
Carmezim et al. Electrolytes in Metal Oxide Supercapcitors 2017 (Year: 2017).*
Cheng et al. CN101746724A English Translation (Year: 2010).*
Tamaura et al. JP2001270701A English Machine Translation (Year: 2001).*
Vishnevetsky et al. International Journal of Hydrogen Energy 2007, 32, 2791-2802 (Year: 2007).*
Brecher et al., "The Westinghouse Sulfur Cycle for the Thermochemical Decomposition of Water", International Journal of Hydrogen Energy, 1977, vol. 2 pp. 7-15.
Horri et al., "A Highly Efficient Hydrogen Generation Electrolysis System Using Alkaline Zinc Hydroxide Solution", International Journal of Hydrogen Energy, Elsevier Science Publishers B.V. Barking, GB, vol. 44(1), Mar. 27, 2018, , pp. 72-81.
International Search Report and Written Opinion for PCT international Application No. PCT/GB2019/052002, mailed Feb. 4, 2020, 15 pages.
Naterer et al., "Progress of International Program on Hydrogen Production with the Copper-Chlorine C", International Journal of Hydrogen Energy, Elsevier Science Publishers B.V. Barking, GB, vol. 39(6), Jan. 10, 2014, pp. 2431-2445.
Rodriguez-Santiago et al., Study of the Electrochemical Step of Novel Active Metal Alloy Thermochemical Cycles for Hydrogen Production, ECS Transaction, vol. 11, 2008, pp. 133-142.
United Kingdom Search report: Patents Act 1977: Search Report Under Section 17(5), Mar. 22, 2019, 4 pages.

* cited by examiner

CONTINUOUS PROCESS FOR SUSTAINABLE PRODUCTION OF HYDROGEN

This application is a 35 U.S.C. § 371 application of International Application No. PCT/GB2019/052002, filed on Jul. 18, 2019, which claims the benefit of European Patent Application GB 1811785.3 filed on Jul. 19, 2018, the entireties of which are hereby incorporated by reference.

The invention relates to a method of producing hydrogen gas. In particular embodiment of the invention, the method may be a sustainable cyclic process. The invention also extends to an apparatus for producing hydrogen gas.

Hydrogen is an important energy carrier and has the potential to replace hydrocarbon based fuels for sustainable development. The current energy related problems with hydrocarbon fuels, such as air pollution, climate change and scarcity of the resource, are important motivations for exploring hydrogen. As an alternative fuel source, hydrogen has the highest specific energy content of all fuels, and can be used for clean power generation in fuel cells with limited or no net atmospheric emissions and is convenient for efficient energy storage. Hydrogen can be used directly as a transportation fuel yielding a higher energy efficiency which is receiving much favourable attention as a technical and political issue.

Currently, several industrial methods of hydrogen production exist, and among these are reforming, photoconversion and electrolysis, which have gained prominence. Their pros and cons have been discussed. Water electrolysis provides the cleanest solution for hydrogen production. Its advantages are (i) it gives zero carbon emissions; (ii) it produces pure hydrogen, influencing fuel cell technology which is heavily affected by impurities in the hydrogen feed; (iii) it is independent of hydrocarbon resources; (iv) it can be operated in small scale plants; and (v) renewable energy sources (such as photovoltaic solar power, wind power, hydroelectric power, etc.) could be easily associated with water electrolysis cells to produce hydrogen.

The electrolytic process of water decomposition is technologically simple and there are many techniques concerning the water electrolysis process, such as alkaline electrolysis, polymer electrolyte membrane (PEM) and solid oxide electrolysis cells (SOEC). A growing issue concerning electrolytic processes are the high energy requirement, cost of installation and low safety, durability and energy efficiency. Some electrolysers especially PEM are highly sensitive to the purity of water, additional water processing must be applied before electrolysis. Therefore intense research efforts go into improving operational conditions including aspects of electrochemical activity of the electrode and electrolyte and reducing total resistance of the electrolysis cell.

The present invention arose from the inventors' work in attempting to overcome the problems associated with the prior art.

In accordance with a first aspect of the invention, there is provided a method of producing hydrogen, the method comprising:
  conducting a thermochemical reaction by contacting a metal, or an alloy thereof, with steam to produce a metal oxide and/or a metal hydroxide and hydrogen;
  contacting the metal oxide and/or the metal hydroxide produced in the thermochemical reaction with water or a basic aqueous solution to produce a solution comprising a metal ion; and
  conducting an electrochemical reaction by applying a voltage across an anode and a cathode, whereby at least a portion of the cathode contacts the solution comprising the metal ion, to produce hydrogen, oxygen and the metal, or the alloy thereof.

Advantageously, both the thermochemical and electrochemical reactions produce hydrogen.

It may be appreciated that the electrochemical reaction may be conducted before the thermochemical reaction.

Accordingly, in accordance with a second aspect, there is provided a method of producing hydrogen, the method comprising:
  contacting a metal oxide and/or a metal hydroxide with water or a basic aqueous solution to produce a solution comprising a metal ion;
  conducting an electrochemical reaction by applying a voltage across an anode and a cathode, whereby at least a portion of the cathode contacts the solution comprising the metal ion, to produce hydrogen, oxygen and a metal, or an alloy thereof; and
  conducting a thermochemical reaction by contacting the metal, or the alloy thereof, produced in the electrochemical reaction with steam to produce the metal oxide and/or the metal hydroxide and hydrogen.

The electrochemical reaction may be conducted continuously or repeatedly. The thermochemical reaction may be conducted continuously or repeatedly. Contacting the metal oxide and/or the metal hydroxide with water or the basic aqueous solution to produce the solution comprising the metal ion may be conducted continuously or repeatedly.

In a preferred embodiment, the electrochemical reaction is conducted continuously. Accordingly, the metal, or the alloy thereof, produced in the electrochemical reaction may be collected as the electrochemical reaction is being conducted. The thermochemical reaction is preferably conducted continuously. Accordingly, the metal, or the alloy thereof, collected from the electrochemical reaction may be fed into the thermochemical reaction as it is being conducted. Furthermore, the metal oxide and/or the metal hydroxide produced in the thermochemical reaction may be collected as the thermochemical reaction is being conducted.

The metal oxide and/or the metal hydroxide collected from the thermochemical reaction may be contacted with water or the basic aqueous solution to produce the solution comprising a metal ion. The solution comprising the metal ion may be fed into an electrochemical cell comprising the cathode as the electrochemical reaction is conducted. Alternatively, the metal oxide and/or the metal hydroxide collected from the thermochemical reaction may be fed into an electrochemical cell comprising the cathode as the electrochemical reaction is conducted. Accordingly, the metal oxide and/or the metal hydroxide will increase the concentration of the metal ions in the solution comprising the metal ion.

In a preferred embodiment, the methods of the first and second aspects are repeated. Advantageously, further hydrogen may be produced without the need to provide any additional metal, an alloy thereof, metal oxide or metal hydroxide.

Accordingly, by way of example, the method may comprise:
  conducting a first thermochemical reaction by contacting a metal, or an alloy thereof, with steam to produce a metal oxide and/or a metal hydroxide and hydrogen;

contacting the metal oxide and/or the metal hydroxide produced in the first thermochemical reaction with water or a basic aqueous solution to produce a solution comprising a metal ion;

conducting a first electrochemical reaction by applying a voltage across an anode and a cathode, whereby at least a portion of the cathode contacts the solution comprising the metal ion, to produce hydrogen, oxygen and the metal, or the alloy thereof;

conducting a second thermochemical reaction by contacting the metal, or the alloy thereof, produced in the first electrochemical reaction with steam to produce the metal oxide and/or the metal hydroxide and hydrogen;

contacting the metal oxide and/or the metal hydroxide produced in the second thermochemical reaction with water or a basic aqueous solution to produce a solution comprising the metal ion; and conducting a second electrochemical reaction by applying a voltage across an anode and a cathode, whereby at least a portion of the cathode contacts the solution comprising the metal ion, to produce hydrogen, oxygen and the metal, or the alloy thereof.

It may be appreciated that the method of the second aspect could similarly be repeatedly.

Preferably, the methods of the first and second aspect are repeatedly multiple times.

Accordingly, the methods of the first and second aspects may comprise discrete steps which are repeated multiple times, or continuous reactions which are run in parallel. Either way, the method of producing hydrogen may be viewed as a thermochemical/electrochemical cycle. As shown in FIG. 14, the only feedstock required for the continuous production of hydrogen gas is water. Accordingly, once an initial quantity of the metal, the alloy thereof, the metal oxide and/or the metal hydroxide has been supplied this can be recycled continuously in the thermochemical/electrochemical cycle. Accordingly, further metal/metal oxide/metal hydroxide will not be required. Similarly, in embodiments where an alkaline solution is used, it can be replenished by adding water and contacting it with the metal oxide and/or the metal hydroxide as it is produced in the thermochemical reaction. However, further base will not be required.

The metal, or the alloy thereof, may be an s-block metal, a p-block metal, a transition metal (i.e. a d-block metal), an f-block metal or an alloy thereof. Preferably, the metal, or the alloy thereof is a transition metal, a p-block metal, or an alloy thereof. The s-block metal, or the alloy thereof, may be an alkaline earth metal or an alloy thereof. The alkaline earth metal, or the alloy thereof, may be selected from the group consisting of beryllium, magnesium, calcium, strontium and barium. The p-block metal, or the alloy thereof, may be selected from the group consisting of tin, lead, thallium, selenium and bismuth. Preferably, the p-block metal is lead or tin. In a most preferred embodiment, the p-block metal, or the alloy thereof, is tin. The transition metal, or the alloy thereof, may be selected from the group consisting of zinc, copper, iron, nickel, cobalt, manganese, titanium, molybdenum, cadmium, chromium, vanadium, silver, rhodium, platinum, palladium, iridium, osmium, rhenium, ruthenium, lanthanum and zirconium. Preferably, the transition metal, or the alloy thereof, is selected from the group consisting of zinc, copper, iron, nickel, cobalt, manganese, chromium and vanadium. More preferably, the transition metal, or the alloy thereof, is selected from the group consisting of zinc, iron, nickel, chromium and vanadium. In a most preferred embodiment, the transition metal, or the alloy thereof, is zinc. The f-block metal, or the alloy thereof, may be selected from the group consisting of cerium, gadolinium, yttrium, holmium, samarium and terbium.

It may be appreciated that the metal oxide and/or the metal hydroxide may be an oxide and/or a hydroxide of one of the above listed metals. For instance, if the metal is a transition metal, or an alloy thereof, the metal oxide and/or the metal hydroxide may be a transition metal oxide and/or a transition metal hydroxide. Similarly, the transition metal oxide and/or transition metal hydroxide may be selected from the group consisting of a zinc oxide (e.g. ZnO), a zinc hydroxide, a copper oxide, a copper hydroxide, an iron oxide, an iron hydroxide, a nickel oxide, a nickel hydroxide, a cobalt oxide, a cobalt hydroxide, a manganese oxide, a manganese hydroxide, a titanium oxide, a titanium hydroxide, a molybdenum oxide, a molybdenum hydroxide, a cadmium oxide, a cadmium hydroxide, a chromium oxide, a chromium hydroxide, a vanadium oxide, a vanadium hydroxide, a silver oxide, a silver hydroxide, a rhodium oxide, a rhodium hydroxide, a platinum oxide, a platinum, hydroxide, a palladium oxide, a palladium hydroxide, an iridium oxide, an iridium hydroxide, an osmium oxide, an osmium hydroxide, a rhenium oxide, a rhenium hydroxide, a ruthenium oxide, a ruthenium hydroxide, a lanthanum oxide, a lanthanum hydroxide a zirconium oxide and a zirconium hydroxide.

Alternatively, if the metal is a p-block metal, or an alloy thereof, the metal oxide and/or the metal hydroxide may be a p-block metal oxide and/or the p-block metal hydroxide. Similarly, the p-block metal oxide and/or the p-block metal hydroxide may be selected from the group consisting of a tin oxide (such as tin dioxide ($SnO_2$) or a stannate ($SnO_3^{2-}$)), a tin hydroxide (such as tin (IV) hydroxide), a lead oxide, a lead hydroxide, a thallium oxide, a thallium hydroxide, a selenium oxide, a selenium hydroxide, a bismuth oxide and a bismuth hydroxide.

Further alternatively, if the metal is an f-block metal, or an alloy thereof, the metal oxide and/or the metal hydroxide may be a f-block metal oxide and/or the f-block metal hydroxide. Similarly, the f-block metal oxide and/or the f-block metal hydroxide may be selected from the group consisting of a cerium oxide, a cerium hydroxide, a gadolinium oxide, a gadolinium hydroxide, a yttrium oxide, a yttrium hydroxide, a holmium oxide, a holmium hydroxide, a samarium oxide, a samarium hydroxide, a terbium oxide and a terbium hydroxide.

In embodiments where the metal oxide and/or the metal hydroxide comprises an anion (e.g. a stannate) the anion may be provided with a counter ion. The counter ion may be an alkali metal ion or an alkaline earth metal ion, for instance, the counter ion may be a lithium ion, a sodium ion, a potassium ion, a rubidium ion, a beryllium ion, a magnesium ion, a calcium ion or a strontium ion. In some embodiments, the ion is a sodium ion. Accordingly, the metal oxide and/or the metal hydroxide may be sodium stannate ($Na_2SnO_3$) or sodium stannate trihydrate ($Na_2[Sn(OH)_6]$).

The metal, or the alloy thereof, may be contacted with steam, wherein the steam flows over the hydrogen at a rate of at least 0.01 standard cubic meters per hour, more preferably wherein the steam flows over the hydrogen at a rate of at least 0.05, at least 0.1, at least 0.15, at least 0.2 or at least 0.25 standard cubic meters per hour, and most preferably wherein the steam flows over the hydrogen at a rate of at least 0.3 or at least 0.31 standard cubic meters per hour. The metal, or the alloy thereof, may be contacted with steam, wherein the steam flows over the hydrogen at a rate of less than 5 standard cubic meters per hour, more preferably wherein the steam flows over the hydrogen at a rate of less than 2, less than 1.75, less than 1.5, less than 1.25 or less than 1 standard cubic meters per hour, and most preferably wherein the steam flows over the hydrogen at a rate of less than 0.8 or less than 0.78 standard cubic meters per hour. The metal, or the alloy thereof, may be contacted with steam, wherein the steam flows over the hydrogen at a rate of between 0.01 and 5 standard cubic meters per hour, more preferably wherein the steam flows over the hydrogen at a rate of between 0.05 and 2, between 0.1 and 1.75, between 0.15 and 1.5, between 0.2 and 1.25 or between 0.25 and 1 standard cubic meters per hour, and most preferably wherein the steam flows over the hydrogen at a rate of between 0.3 and 0.8 or between 0.31 and 0.78 standard cubic meters per hour.

Preferably, the metal, or the alloy thereof, is contacted with steam at a temperature of at least 100° C., more preferably at a temperature of at least 150° C., at least 200° C. or at least 250° C., and most preferably at a temperature of at least 300° C. or at least 350° C. Preferably, the metal, or the alloy thereof, is contacted with steam at a temperature of less than 700° C., more preferably at a temperature of less than 650° C., less than 600° C. or less than 550° C., and most preferably at a temperature of less than 500° C. or less than 450° C. Preferably, the metal, or the alloy thereof, is contacted with steam at a temperature of between 100° C. and 700° C., more preferably at a temperature of between 150° C. and 650° C., between 200° C. and 600° C. or between 250° C. and 550° C., and most preferably at a temperature of between 300° C. and 500° C. or between 350° C. and 450° C. Advantageously, at higher temperatures, hydrogen is produced more quickly.

Preferably, the metal, or the alloy thereof, is contacted with steam at a pressure of at least 10 kPa, more preferably at a temperature of at least 50 kPa, at least 75 kPa or at least 100 kPa, and most preferably at a temperature of at least 500 kPa, at least 1,000 kPa or at least 20,000 kPa. Preferably, the metal, or the alloy thereof, is contacted with steam at a pressure of less than 500,000 kPa, more preferably at a pressure of less than 300,000 kPa, less than 200,000 kPa or less than 100,000 kPa, and most preferably at a temperature of less than 50,000 kPa, less than 40,000 kPa or less than 30,000 KPa. Preferably, the metal, or the alloy thereof, is contacted with steam at a pressure of between 10 and 500,000 kPa, more preferably at a pressure of between 50 and 300,000 kPa, between 75 and 200,000 kPa or between 100 and 100,000 kPa, and most preferably at a pressure of between 500 and 50,000 kPa, between 1,000 and 40,000 kPa or between 2,000 and 30,000 kPa.

The metal, or the alloy thereof, may comprise a powder, pellets or flakes.

The method may comprise placing the metal, or the alloy thereof, in a thermochemical reactor prior to contacting the metal, or the alloy thereof, with steam. The method may comprise continuously feeding the metal, or the alloy thereof, into the thermochemical reactor while the thermochemical reaction is being conducted. Methods of continuously feeding the metal, or the alloy thereof, into the thermochemical reactor will be known to the skilled person. For instance, the thermochemical reactor may comprise a first rotary valve configured to feed the metal, or the alloy thereof, into the thermochemical reactor. The first rotary valve may be a motorised rotary valve.

The method may comprise removing the metal oxide and/or the metal hydroxide from a thermochemical reactor at the end of the thermochemical reaction. Alternatively, the method may comprise removing the metal oxide and/or the metal hydroxide from a thermochemical reactor while the thermochemical reaction is being conducted. Methods of continuously removing the metal oxide and/or the metal hydroxide will be known to the skilled person. For instance, the thermochemical reactor may comprise a second rotary valve configured to remove the metal oxide and/or the metal hydroxide therefrom. The second rotary valve may be a motorised rotary valve.

The method may comprise agitating the metal, or the alloy thereof, while it is being contacted with the steam. Accordingly, the method may comprise conducting the thermochemical reaction in a self-agitated thermochemical reactor. The self-agitated reactor may be a spouted-bed reactor, a fluidized-bed reactor or a pneumatic conveying-bed reactor. Advantageously, agitating the metal, or the alloy thereof, increases the surface area which contacts the steam and increases the efficiency of the thermochemical reaction.

It may be appreciated that hydrogen produced in the thermochemical reaction will be present in a gaseous mixture further comprising unreacted steam. Accordingly, the method may comprise condensing unreacted steam from a gaseous mixture obtained from the thermochemical reaction. Advantageously, if no carrier gas is used in the reaction, the condensation step will allow a user to obtain hydrogen gas.

In some embodiments, the steam which is used to contact the metal, or the alloy thereof, may be provided together with a carrier gas. The carrier gas may be an inert gas, such as nitrogen or argon. Accordingly, the gaseous mixture may further comprise the carrier gas. Accordingly, the method may comprise separating the hydrogen from the inert gas. The method may comprise using a pressure swing absorption unit or a cryogenic system to separate the hydrogen from the inert gas.

The method may comprise:
contacting the metal oxide and/or the metal hydroxide with water or the basic aqueous solution to produce the solution comprising the metal ion in a first container; and
disposing the solution comprising the metal ion in an electrochemical cell comprising the anode and the cathode, such that at least a portion of the cathode contacts the solution comprising the metal ion,
wherein the first container is separate to the electrochemical cell.

Alternatively, the method may comprise contacting the metal oxide and/or the metal hydroxide produced in the thermochemical reaction with water or the basic aqueous solution to produce the solution comprising the metal ion in the electrochemical cell, such that at least a portion of the cathode contacts the resultant solution comprising the metal ion.

In some embodiments, the method comprises contacting the metal oxide with the basic aqueous solution. In some embodiments, the method comprises contacting the metal hydroxide with the basic aqueous solution. In some embodiments, the method comprises contacting the metal oxide with water. In some embodiments, the method comprises contacting the metal hydroxide with water.

It may be appreciated that the basic aqueous solution comprises a base. The base may be an organic or an inorganic base. The base may be an Arrhenius base, a Lewis base, and/or a Bronsted-Lowry base, more preferably a strong Arrhenius base and/or a Lewis superbase. The Arrhenius base may comprise an alkali metal or alkaline earth metal hydroxide. The Arrhenius base may comprise potassium hydroxide, sodium hydroxide, barium hydroxide, caesium hydroxide, strontium hydroxide, calcium hydroxide, lithium hydroxide and/or rubidium hydroxide. Accordingly, the basic aqueous solution may comprise an aqueous alkaline solution.

The Lewis base may comprise ammonia (NH), butyllithium (n-BuLi), lithium diisopropylamide (LDA), lithium diethylamide (LDEA), sodium amide, sodium hydride (NaH) and/or lithium bis(trimethylsilyl)amide.

The Bronsted-Lowry base may comprise ammonium hydroxide, an aliphatic amine, or an aromatic amine. The aliphatic amine may comprise methylamine, ethylamine or dimethylamine. The aromatic amine may comprise aniline, phenylenediamine or o-toludine.

In a preferred embodiment, the basic aqueous solution comprises an Arrhenius base.

The basic aqueous solution may comprise a concentration of at least 0.5 M, at least 1 M or at least 1.5 M of the base, more preferably at least 2 M, at least 2.5 M or at least 3 M of the base, and most preferably at least 3.5 M or at least 4 M of the base. The basic aqueous solution may comprise a concentration of less than 8.5 M, less than 8 M or less than 7.5 M of the base, more preferably less than 7 M, less than 6.5 M or less than 6 M of the base, and most preferably less than 5.5 M or less than 5 M of the base. The basic aqueous solution may comprise a concentration of between 0.5 and 8.5 M, between 1 and 8 M or between 1.5 and 7.5 M of the base, more preferably between 2 and 7 M, between 2.5 and 6.5 M or between 3 and 6 M of the base, and most preferably between 3.5 and 5.5 M or between 4 and 5 M of the base. Advantageously, the inventors have found that solutions comprising about 4.5 M sodium hydroxide exhibit the greatest conductivity.

The metal oxide and/or the metal hydroxide may be contacted with water or the basic aqueous solution in a sufficient quantity to produce the solution comprising the metal ion, wherein the metal ion is present at a concentration of at least 0.001 M or at least 0.005 M, more preferably at least 0.01 M, at least 0.02 M or at least 0.06 M, and most preferably at least 0.08 M or at least 0.1 M. In some embodiment, the metal ion is present at a concentration of at least 0.2 M or at least 0.6 M, and most preferably at least 0.8 M or at least 1 M. The metal oxide and/or the metal hydroxide may be contacted with water or the basic aqueous solution in a sufficient quantity to produce the solution comprising the metal ion, wherein the metal ion is present at a concentration of less than 5 M, less than 4 M, less than 3 M, less than 2 M, less than 1.5 M, less than 1 M or less than 0.5 M, more preferably less than 0.3 M, less than 0.25 M or less than 0.2 M, and most preferably less than 0.17 M or less than 0.14 M. The metal oxide and/or the metal hydroxide may be contacted with water or the basic aqueous solution in a sufficient quantity to produce the solution comprising the metal ion, wherein the metal ion is present at a concentration of between 0.001 and 5 M or between 0.005 and 4 M, more preferably between 0.02 and 3 M, between 0.06 and 2 M or between 0.1 and 1.5 M.

In one embodiment, the metal oxide and/or the metal hydroxide is contacted with water or the basic aqueous solution in a sufficient quantity to produce the solution comprising the metal ion, wherein the metal ion is present at a concentration of between 0.001 and 1 M or between 0.005 and 0.5 M, more preferably between 0.01 and 0.3 M, between 0.02 and 0.25 M or between 0.06 and 0.2 M, and most preferably between 0.08 and 1.7 M or between 0.1 and 0.14 M. Preferably, in this embodiment, the metal oxide and/or the metal hydroxide is contacted with the basic aqueous solution.

In an alternative embodiment, the metal oxide and/or the metal hydroxide is contacted with water or the basic aqueous solution in a sufficient quantity to produce the solution comprising the metal ion, wherein the metal ion is present at a concentration of between 0.2 and 5 M or between 0.4 and 4 M, more preferably between 0.6 and 3 M or between 1 and 1.5 M. Preferably, in this embodiment, the metal oxide and/or the metal hydroxide is contacted with water.

The anode and the cathode may be disposed in an electrochemical cell. The electrochemical cell may be an undivided cell. Accordingly, in this embodiment, disposing the solution comprising the metal ion in the electrochemical cell will cause at least a portion of the anode to contact the solution comprising the metal ion. An undivided cell may be used in embodiments where the metal oxide and/or the metal hydroxide is contacted with water.

In an alternative embodiment, the electrochemical cell comprises a divided cell. Accordingly, the cell may comprise a membrane disposed between the anode and the cathode dividing the cell into two portions. Preferably, the membrane is an anion exchange membrane, more preferably an alkaline anion exchange membrane (AAEM). Suitable AAEMs will be known to the skilled person, but could include a polymer anion exchange base membrane of a chloromethylated polysulfone, or a copolymer of chloromethylstyrene and divinylvenzene with polyethylene fabric. An undivided cell may be used in embodiments where the metal oxide and/or the metal hydroxide is contacted with the basic aqueous solution.

In this embodiment, the method may comprise disposing the solution comprising the metal ion in a cathode portion of the cell, such that at least a portion of the cathode contacts the solution comprising the metal alloy. The method may also comprise disposing a further electrolyte in an anode portion of the cell, such that at least a portion of the anode contacts the further electrolyte. The further electrolyte preferably comprises an aqueous solution, and more preferably a basic aqueous solution. The basic aqueous solution may be as defined above.

It may be appreciated that as the electrochemical reaction proceeds the water will react to produce hydrogen and oxygen. Accordingly, the concentration of the base in the solution comprising the metal alloy will increase. Similarly, in embodiments where the cell comprises a divided cell, the concentration of a base in the further electrolyte will also increase.

Accordingly, the method may comprise contacting the solution comprising the metal alloy with a sufficient quantity of water to cause the solution comprising the metal alloy to have a desired concentration of base. The method may comprise monitoring the pH of the solution comprising the metal alloy, and contacting the solution comprising the metal alloy with a sufficient quantity of water to cause the solution comprising the metal alloy to have a desired concentration of base when the pH rises above a predetermined maximum.

In embodiments where the cell comprises a divided cell, the method may comprise contacting the further electrolyte with a sufficient quantity of water to cause the further electrolyte to have a desired concentration of base. The method may comprise monitoring the pH of the further electrolyte, and contacting the further electrolyte with a sufficient quantity of water to cause the further electrolyte to have a desired concentration of base when the pH rises above a predetermined maximum.

The desired concentration of base may be at least 0.5 M, at least 1 M or at least 1.5 M of base, more preferably at least 2 M, at least 2.5 M or at least 3 M of base, and most preferably at least 3.5 M or at least 4 M of base. The desired concentration of base may be less than 8.5 M, less than 8 M or less than 7.5 M of the base, more preferably less than 7 M, less than 6.5 M or less than 6 M of the base, and most preferably less than 5.5 M or less than 5 M of the base.. The desired concentration of base may be 0.5 and 8.5 M, between 1 and 8 M or between 1.5 and 7.5 M of the base, more preferably between 2 and 7 M, between 2.5 and 6.5 M or between 3 and 6 M of base, and most preferably between 3.5 and 5.5 M or between 4 and 5 M of the base.

The predetermined maximum pH may correspond to a concentration of base of at least 8.5 M, at least 8 M or at least 7.5 M of the base, more preferably at least 7 M, at least 6.5 M or at least 6 M base, and most preferably at least 5.5 M or at least 5 M of the base.

The method may comprise continuously feeding the solution comprising the metal ion into the electrochemical cell while the electrochemical reaction is being conducted. The method may further comprise removing the solution comprising the metal ion from the cell as the electrochemical reaction is being conducted. Advantageously, this step continuously refreshes the solution comprising the metal ion.

In embodiments where the cell is a divided cell, the method may comprise feeding the solution comprising the metal ion into the cathode portion of the electrochemical cell while the electrochemical reaction is being conducted. The method may further comprise removing the solution comprising the metal ion from the cathode portion of the cell as the electrochemical reaction is being conducted. The method may comprise feeding the further electrolyte into the anode portion of the electrochemical cell while the electrochemical reaction is being conducted and/or removing the further electrolyte from the cathode portion of the cell as the electrochemical reaction is being conducted.

The anode and cathode may independently comprise a carbon based electrode or a metal based electrode. The or each carbon based electrode may comprise graphite. The or each metal based electrode may comprise chromium, nickel, zinc, cadmium, copper, tin, lead, rhodium, platinum, gold, palladium, iridium, osmium, rhenium, ruthenium, germanium, beryllium, and/or silver. Alternatively, the or each metal based electrode may comprise an alloy, such as brass, bronze or steel. The steel may be stainless steel. In a preferred embodiment, the electrodes comprise graphite or steel. In an alternative preferred embodiment, the electrodes comprise the same metal as the metal, or the alloy thereof. For instance, if the electrochemical reaction produces zinc, then the electrodes may comprise zinc.

The method may comprise applying a voltage of at least 1V, at least 1.5 V, at least 1.75 V or at least 2 V across the anode and cathode, more preferably the method comprises applying a voltage of at least 2.5 V, at least 3 V or at least 3.5 V across the anode and cathode, and most preferably the method comprises applying a voltage of at least 4 V or at least 4.5 V across the anode and cathode. The method may comprise applying a voltage of less than 8 V or less than 7.5 V across the anode and cathode, more preferably the method comprises applying a voltage of less than 7 V, less than 6.5 V or less than 6 V across the anode and cathode, and most preferably the method comprises applying a voltage of less than 5.5 V or less than 5 V across the anode and cathode. In some embodiments, the method comprises applying a voltage of less than 4 V, less than 3 V or less than 2.5 V. The method may comprise applying a voltage of between 1 and 8 V or between 2 and 7.5 V across the anode and cathode. In some embodiments, the method comprises applying a voltage of between 2.5 and 7 V, between 3 and 6.5 V or between 3.5 and 6 V across the anode and cathode, and most preferably the method comprises applying a voltage of between 4 and 5.5 V or between 4.5 and 5 V across the anode and cathode. In alternative embodiment, the method comprises applying a voltage of between 1 and 4 V, between 1.5 and 3 V or between 1.75 and 2.5 V across the anode and cathode.

The method may comprise causing a current of at least 0.5 A, at least 1 A or at least 1.5 A to flow through the anode, cathode and the solution comprising the metal ion, more preferably causing a current of at least 2 A, at least 2.5 A or at least 3 A to flow through the anode, cathode and the solution comprising the metal ion and most preferably causing a current of at least 3.5 A to flow through the anode, cathode and the solution comprising the metal ion. The method may comprise causing a current of less than 10 A, less than 8 A or less than 6 A to flow through the anode, cathode and the solution comprising the metal ion, more preferably causing a current of less than 5.5 A, less than 5 A or less than 4.5 A to flow through the anode, cathode and the solution comprising the metal ion and most preferably causing a current of less than 4 A to flow through the anode, cathode and the solution comprising the metal ion. The method may comprise causing a current of between 0.5 and 10 A, between 1 and 8 A or between 1.5 and 6 A to flow through the anode, cathode and the solution comprising the metal ion, more preferably causing a current of between 2 and 5.5 A, between 2.5 and 5 A or between 3 and 4.5 A to flow through the anode, cathode and the solution comprising the metal ion and most preferably causing a current of between 3.5 and 4 A to flow through the anode, cathode and the solution comprising the metal ion.

Preferably, the electrochemical reaction is conducted at a temperature of at least ° C., more preferably at a temperature of at least 10° C., at least 12.5° C., at least 15° C., at least 17.5° C. or at least 20° C. In some embodiments, the electrochemical reaction is conducted at a temperature of at least 25° C., and most preferably at a temperature of at least 30° C. or at least 55° C. Preferably, the electrochemical reaction is conducted at a temperature of less than 95° C., more preferably at a temperature of less than 90° C., less than 85° C. or less than 80° C., and most preferably at a temperature of less than 70° C. or less than 65° C. In some embodiments, the electrochemical reaction is conducted at a temperature of less than 50° C., less than 40° C., less than 30° C. or less than 25° C. Preferably, electrochemical reaction is conducted at a temperature of between ° C. and 95° C., more preferably at a temperature of between 10° C. and 90° C. In some embodiments, the electrochemical reaction is conducted at a temperature between 20° C. and 85° C. or between 25° C. and 80° C., and most preferably at a temperature of between 30° C. and 70° C. or between 55° C. and 65° C. Advantageously, at higher temperatures, hydrogen is produced more quickly. In some embodiments, the electrochemical reaction is conducted at a temperature between 10° C. and 50° C., between 12.5 and 40° C., between 15° C. and 30° C. or between 17.5° C. and 25° C.

Preferably, the method comprises recovering the metal, or the alloy thereof, produced in the electrochemical reaction. Recovering the metal, or the alloy thereof, produced in the electrochemical reaction may comprise removing the metal, or the alloy thereof, produced in the electrochemical reaction from the cathode. The metal, or the alloy thereof, may be removed after the electrochemical reaction has been completed. Alternatively, the metal, or the alloy thereof, may be removed continuously as the electrochemical reaction is conducted. For instance, the electrochemical cell may comprise a blade configured to remove the metal, or the alloy thereof, from the cathode. The blade may be configured to move across the cathode and thereby remove the metal, or the alloy thereof, from a surface of the cathode. The blade may be moved using a magnetic force or an electromotor. The electrochemical cell may comprise a collection vessel configured to receive the metal, or the alloy thereof once it has been removed from the cathode and to remove it from the cell. In embodiments where the cell is a divided cell, the collection vessel may be disposed in the cathode portion of the cell. The collection vessel may comprise a rotary valve configured to receive the metal, or the alloy thereof once it has been removed from the cathode and to remove it from the cell. The rotary valve may be motorised.

The inventors believe that the apparatus used to conduct the methods of the first and second aspects is novel and inventive per se.

Accordingly, in accordance with a third aspect there is provided an apparatus for producing hydrogen, the apparatus comprising:
- a thermochemical reactor, configured to hold a metal, or an alloy thereof, therein, the thermochemical reactor comprising a feed means configured to feed steam into the thermochemical reactor and thereby convert the metal, or the alloy thereof, into a metal oxide and/or a metal hydroxide; and
- an electrochemical cell comprising an anode and a cathode, and configured to receive a solution comprising a metal ion, such that at least a portion of the cathode contacts the solution comprising the metal ion.

Preferably, the apparatus is configured to prevent the metal, the alloy thereof or the metal oxide and/or the metal hydroxide from escaping from the thermochemical reactor while a thermochemical reaction is being conducted therein. Accordingly, the apparatus may comprise a container configured to hold the metal, or the alloy thereof, therein and to be placed in the thermochemical reactor. The feed means may be configured to feed steam directly into the container. The container may comprise a mesh configured to allow gases to flow out of the container while being further configured to prevent the metal, the alloy thereof or the metal oxide and/or the metal hydroxide from being removed from the container. The mesh may comprise a pore size of between 0.1 and 1000 µm, more preferably between 1 and 750 µm, between 2 and 500 µm or between 3 and 250 µm, and most preferably between 5 and 100 µm, between 10 and 50 µm, between 15 and 40 µm or between 20 and 30 µm. The mesh may be sandwiched between two or more further meshes. The further meshes may comprise a pore size of between 0.1 and 1000 µm, more preferably between 10 and 900 µm, between 25 and 850 µm or between 50 and 800 µm, and most preferably between 75 and 750 µm, between 100 and 700 µm, between 125 and 650 µm or between 150 and 600 µm. Advantageously, the further meshes ensure that the resultant mesh structure has enough strength to hold the weight of the metal, the alloy thereof and/or the metal oxide and/or the metal hydroxide.

The apparatus may comprise agitation means configured to agitate the metal, or the alloy thereof in the thermochemical reactor. Accordingly, the thermochemical reactor may comprise a self-agitated thermochemical reactor. The self-agitated thermochemical reactor may be a spouted-bed reactor, a fluidized-bed reactor or a pneumatic conveying-bed reactor.

Preferably, the thermochemical reactor is configured to hold the metal, or the alloy thereof at a temperature of at least 100° C., more preferably at a temperature of at least 150° C., at least 200° C. or at least 250° C., and most preferably at a temperature of at least 300° C. or at least 350° C. Preferably, the thermochemical reactor is configured to hold the metal, or the alloy thereof at a temperature of less than 700° C., more preferably at a temperature of less than 650° C., less than 600° C. or less than 550° C., and most preferably at a temperature of less than 500° C. or less than 450° C. Preferably, the thermochemical reactor is configured to hold the metal, or the alloy thereof at a temperature of between 100° C. and 700° C., more preferably at a temperature of between 150° C. and 650° C., between 200° C. and 600° C. or between 250° C. and 550° C., and most preferably at a temperature of between 300° C. and 500° C. or between 350° C. and 450° C.

Apparatus capable of feeding steam into the thermochemical reactor will be well known to the skilled person. For instance, the feed means may be configured to cause water disposed therein to evaporate, and thereby form steam. Accordingly, the feed means may comprise a coiled section disposed in the thermochemical reactor. The apparatus may comprise a pump configured to pump water or steam, preferably water, into the feed means. The pump may comprise a syringe pump.

The apparatus may comprise feed means configured to feed the metal, or the alloy thereof, into the thermochemical reactor. The feed means may comprise a first rotary valve. The first rotary valve may be a motorised rotary valve.

The apparatus may comprise feed means configured to feed the metal oxide and/or the metal hydroxide out of the reactor. The feed means may comprise a second rotary valve. The second rotary valve may be a motorised rotary valve.

The apparatus may comprise a condenser configured to remove steam from a gas mixture. Preferably, the apparatus comprises a conduit which extends between the thermochemical reactor and the condenser. Accordingly, the condenser may condense unreacted steam to obtain hydrogen gas.

The apparatus may comprise pressure swing absorption unit or a cryogenic system configured to separate hydrogen from a carrier gas.

The apparatus may comprise a hydrogen collection vessel configured to receive hydrogen gas produced in the thermochemical reactor. The apparatus may comprise a conduit extending between the condenser and the hydrogen collection vessel.

The electrochemical cell may be an undivided cell.

Alternatively, the electrochemical cell may comprise a divided cell. Accordingly, the cell may comprise a membrane disposed between the anode and the cathode dividing the cell into two portions. Preferably, the membrane is as defined in relation to the first and second aspects.

In this embodiment, a cathode portion of the cell may be configured to receive the solution comprising the metal ion, such that at least a portion of the cathode contacts the solution comprising the metal ion. An anode portion of the cell may be configured to receive a further electrolyte, such that at least a portion of the anode contacts the electrolyte. The further electrolyte may be as defined in relation to the first and second aspects.

The apparatus may comprise a reservoir configured to contain the solution comprising the metal ion. The apparatus may comprise a first conduit extending between the reservoir and the electrochemical cell, and a pump configured to cause the solution comprising the metal ion to flow from the reservoir, along the first conduit and into the first electrochemical cell. The apparatus may comprise a second conduit extending between the electrochemical cell and the reservoir, and a pump configured to cause the solution comprising the metal ion to flow from the electrochemical cell, along the second conduit and into the reservoir. The same pump may be configured to cause the solution comprising the metal ion to flow from the reservoir, along the first conduit and into the electrochemical cell and to also cause the solution comprising the metal ion to flow from the electrochemical cell, along the second conduit and into the reservoir. The or each pump may be a peristaltic pump.

The apparatus may comprise a pH meter configured to monitor the pH of the solution comprising the metal ion. The pH meter may be disposed in the reservoir or the electrochemical cell. Preferably, the pH meter is disposed in the reservoir. The apparatus may comprise feed means configured to feed water into the reservoir or the electrochemical cell. Preferably, the feed means configured to feed water into the reservoir. The apparatus may be configured to feed water into the reservoir or the electrochemical cell when the pH meter senses a pH which is above a predetermined maximum pH.

The apparatus may comprise feed means configured to feed the metal oxide and/or the metal hydroxide into the reservoir or the electrochemical cell. Preferably, the feed means is configured to feed the metal oxide and/or the metal hydroxide into the reservoir. The feed means may comprise a rotary valve. The rotary valve may be a motorised rotary valve.

In embodiments where the cell is a divided cell, the apparatus may comprise a first reservoir configured to contain the solution comprising the metal ion. The apparatus may comprise a first conduit extending between the reservoir and the cathode portion of the electrochemical cell, and a pump configured to cause the solution comprising the metal ion to flow from the first reservoir, along the first conduit and into the cathode portion of the electrochemical cell. The apparatus may comprise a second conduit extending between the cathode portion of the electrochemical cell and the first reservoir, and a pump configured to cause the solution comprising the metal ion to flow from the cathode portion of the electrochemical cell, along the second conduit and into the first reservoir. The same pump may be configured to cause the solution comprising the metal ion to flow from the first reservoir, along the first conduit and into the cathode portion of the electrochemical cell and to also cause the solution comprising the metal ion to flow from the cathode portion of the electrochemical cell, along the second conduit and into the first reservoir. The or each pump may be a peristaltic pump.

The apparatus may comprise a second reservoir configured to contain the further electrolyte. The apparatus may comprise a third conduit extending between the second reservoir and the anode portion of the electrochemical cell, and a pump configured to cause the further electrolyte to flow from the second reservoir, along the third conduit and into the anode portion of the electrochemical cell. The apparatus may comprise a fourth conduit extending between the anode portion of the electrochemical cell and the second reservoir, and a pump configured to cause the further electrolyte to flow from the anode portion of the electrochemical cell, along the fourth conduit and into the second reservoir. The same pump may be configured to cause the further electrolyte to flow from the second reservoir, along the third conduit and into the anode portion of the electrochemical cell and to also cause the further electrolyte to flow from the anode portion of the electrochemical cell, along the fourth conduit and into the second reservoir. The or each pump may be a peristaltic pump.

The apparatus may comprise a first pH meter configured to monitor the pH of the solution comprising the metal ion. The first pH meter may be disposed in the first reservoir or the cathode portion of the electrochemical cell. Preferably, the first pH meter is disposed in the first reservoir. The apparatus may comprise feed means configured to feed water into the first reservoir or the cathode portion of the electrochemical cell. Preferably, the feed means configured to feed water into the first reservoir. The apparatus may be configured to feed water into the first reservoir or the cathode portion of the electrochemical cell when the first pH meter senses a pH which is above a predetermined maximum pH.

The apparatus may comprise a second pH meter configured to monitor the pH of the further analyte. The second pH meter may be disposed in the second reservoir or the anode portion of the electrochemical cell. Preferably, the second pH meter is disposed in the second reservoir. The apparatus may comprise feed means configured to feed water into the second reservoir or the anode portion of the electrochemical cell. Preferably, the feed means configured to feed water into the second reservoir. The apparatus may be configured to feed water into the second reservoir or the anode portion of the electrochemical cell when the second pH meter senses a pH which is above a predetermined maximum pH.

The apparatus may comprise feed means configured to feed the metal oxide and/or the metal hydroxide into the first reservoir or the cathode portion of the electrochemical cell. Preferably, the feed means is configured to feed the metal oxide and/or the metal hydroxide into the first reservoir. The feed means may comprise a rotary valve. The rotary valve may be a motorised rotary valve.

The anode and cathode may be as defined in relation to the first and second aspects.

The apparatus may comprise removal means configured to remove the metal, or the alloy thereof, from the electrochemical cell. The removal means may comprise means for removing the metal, or the alloy thereof, from the cathode. The removal means may comprise a blade configured to remove the metal, or the alloy thereof, from the cathode. The blade may be configured to move across the cathode and thereby remove the metal, or the alloy thereof, from a surface of the cathode. The apparatus may be configured to move the blade using a magnetic force or an electromotor. The removal means may comprise a collection vessel configured to receive the metal, or the alloy thereof once it has been removed from the cathode and to remove it from the cell. In embodiments where the cell is a divided cell, the collection vessel may be disposed in the cathode portion of the cell. The collection vessel may comprise a rotary valve configured to receive the metal, or the alloy thereof once it has been removed from the cathode and to remove it from the cell. The rotary valve may be motorised.

The apparatus may comprise a power supply configured to apply a voltage across the anode and cathode. The power supply may comprise a battery, a generator, a renewable power source or it could comprise the national grid. The renewable power source may comprise a solar power generator, wind power or a hydropower generator. The power supply may be configured to supply a direct current to the anode and cathode.

The power supply may be configured to apply a voltage of at least 1 V or at least 2 V across the anode and cathode, more preferably a voltage of at least 2.5 V, at least 3 V or at least 3.5 V across the anode and cathode, and most preferably a voltage of at least 4 V or at least 4.5 V across the anode and cathode. The power supply may be configured to apply a voltage of less than 8 V or less than 7.5 V across the anode and cathode, more preferably a voltage of less than 7 V, less than 6.5 V or less than 6 V across the anode and cathode, and most preferably a voltage of less than 5.5 V or less than 5 V across the anode and cathode. The power supply may be configured to apply a voltage of between 1 and 8 V or between 2 and 7.5 V across the anode and cathode, more preferably a voltage of between 2.5 and 7 V, between 3 and 6.5 V or between 3.5 and 6 V across the anode and cathode, and most preferably a voltage of between 4 and 5.5 V or between 4.5 and 5 V across the anode and cathode.

The power supply may be configured to cause a current of at least 0.5 A, at least 1 A or at least 1.5 A to flow through the anode, cathode and the solution comprising the metal ion, more preferably to cause a current of at least 2 A, at least 2.5 A or at least 3 A to flow through the anode, cathode and the solution comprising the metal ion and most preferably to cause a current of at least 3.5 A to flow through the anode, cathode and the solution comprising the metal ion. The power supply may be configured to cause a current of less than 10 A, less than 8 A or less than 6 A to flow through the anode, cathode and the solution comprising the metal ion, more preferably to cause a current of less than 5.5 A, less than 5 A or less than 4.5 A to flow through the anode, cathode and the solution comprising the metal ion and most preferably to cause a current of less than 4 A to flow through the anode, cathode and the solution comprising the metal ion. The power supply may be configured to cause a current of between 0.5 and 10 A, between 1 and 8 A or between 1.5 and 6 A to flow through the anode, cathode and the solution comprising the metal ion, more preferably to cause a current of between 2 and 5.5 A, between 2.5 and 5 A or between 3 and 4.5 A to flow through the anode, cathode and the solution comprising the metal ion and most preferably to cause a current of between 3.5 and 4 A to flow through the anode, cathode and the solution comprising the metal ion.

The apparatus may comprise a hydrogen collection vessel configured to receive hydrogen gas produced in the electrochemical cell. The apparatus may comprise a conduit extending between the electrochemical cell and the hydrogen collection vessel. In embodiments where the cell is a divided cell, the conduit may extend between the cathode portion of the electrochemical cell and the hydrogen collection vessel.

The hydrogen collection vessel configured to receive hydrogen gas produced in the thermochemical reactor may also be the hydrogen collection vessel configured to receive hydrogen gas produced in the electrochemical cell. Alternatively, the apparatus could comprise two separate hydrogen collection vessels.

In accordance with a further aspect, there is provided a method of producing hydrogen, the method comprising:
  conducting a thermochemical reaction by contacting a metal, or an alloy thereof, with steam to produce a metal oxide and hydrogen;
  contacting the metal oxide produced in the thermochemical reaction with an aqueous alkaline solution to produce a solution comprising a metal ion; and
  conducting an electrochemical reaction by applying a voltage across an anode and a cathode, whereby at least a portion of the cathode contacts the solution comprising the metal ion, to produce hydrogen, oxygen and the metal, or the alloy thereof.

In accordance with a still further aspect, there is provided a method of producing hydrogen, the method comprising:
  contacting a metal oxide with an aqueous alkaline solution to produce a solution comprising a metal ion;
  conducting an electrochemical reaction by applying a voltage across an anode and a cathode, whereby at least a portion of the cathode contacts the solution comprising the metal ion, to produce hydrogen, oxygen and a metal, or an alloy thereof; and
  conducting a thermochemical reaction by contacting the metal, or the alloy thereof, produced in the electrochemical reaction with steam to produce the metal oxide and hydrogen.

In accordance with a final aspect there is provided an apparatus for producing hydrogen, the apparatus comprising:
  a thermochemical reactor, configured to hold a metal, or an alloy thereof, therein, the thermochemical reactor comprising a feed means configured to feed steam into the thermochemical reactor and thereby convert the metal, or the alloy thereof, into a metal oxide; and
  an electrochemical cell comprising an anode and a cathode, and configured to receive a solution comprising a metal ion, such that at least a portion of the cathode contacts the solution comprising the metal ion.

The apparatus may comprise an oxygen collection vessel configured to receive oxygen gas produced in the electrochemical cell. The apparatus may comprise a conduit extending between the electrochemical cell and the oxygen collection vessel. In embodiments where the cell is a divided cell, the conduit may extend between the anode portion of the electrochemical cell and the oxygen collection vessel.

All features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying drawings, in which:—

EXAMPLE 1—THERMOCHEMICAL REACTION OF ZINC

The first experiment conducted involved reacting zinc with steam to form zinc oxide and hydrogen.

Methods

Figure 1:
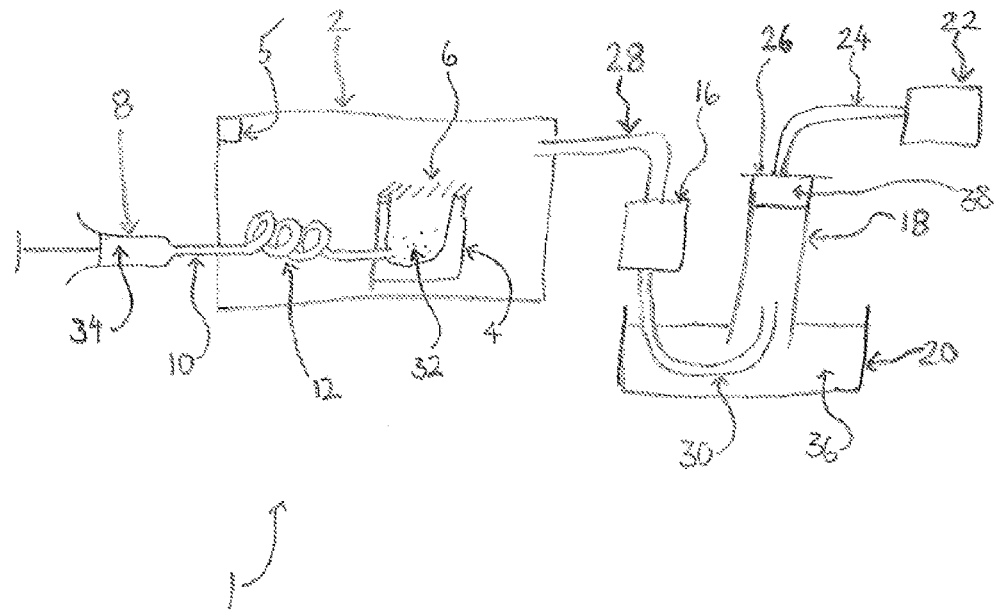
FIG. 1 is schematic diagram of the apparatus used to conduct a thermochemical reaction.

The thermochemical experiment was carried out using the apparatus 1 shown in FIG. 1. The apparatus 1 comprises a tube furnace 2 with a crucible 4 and a temperature sensor 5 disposed therein. The crucible 4 comprises a mesh cover 6.

A syringe pump 8 is disposed outside the furnace 2 and a conduit 10 extends between the syringe pump 8 and the crucible 4. The conduit 10 comprises a coiled section 12 which is disposed inside the furnace 2.

A condenser 16, measuring cylinder 18, water bath 20 and vacuum pump 22 are also disposed outside the furnace 2. The cylinder 18 is inverted in the water bath 20, and a conduit 24 extends between the base 26 of the cylinder 18 and the vacuum pump 22. A conduit 28 extends between the furnace 2 and the condenser 16 and a further conduit 30 extends between the condenser and the cylinder 18.

When a user wishes to run an experiment, they place a pre-weighed amount of zinc 32 in the crucible 4. In the experiments described below, 10 g of zinc was used for each experiment.

The user fills the syringe pump 8 with deionised water 34. The user also fills the water bath 20 with water 36 and activates the vacuum pump 22. The vacuum pump 22 removes gas from the cylinder 18 and causes it to be replaced by the water 36. The user then flushes the system with nitrogen and then activates the oven 2 and waits for it to reach a desired temperature.

Before running the experiment, the user will again activate the vacuum pump 22 to remove any gases which have entered the cylinder 18 due to gas expansion caused by the oven 2 heating up. The user will then activate the syringe pump 8. This will feed the deionised water 34 along the conduit 10. As the deionised water 34 passes through the coiled section 12 it will evaporate ensuring that steam is fed into the crucible 4 and contacts the zinc powder 32. The steam will react with the zinc 32 according to the following equation:

$$Zn_{(s)}+H_2O_{(l)} \rightarrow ZnO_{(s)}+H_{2(g)} \quad \quad 1a$$

The mesh will prevent the zinc 32 and zinc oxide from escaping from the crucible, while allowing the gases to flow therefrom. The gases will then flow along the conduit 28 and through the condenser 16, which will condense the steam into water and remove it. The hydrogen gas 38 will continue to flow along the conduit 30 and into the cylinder 38 displacing the water 36. The user can thereby measure the volume of hydrogen gas 38 produced. In the experiments described below, a reading was taken every five minutes.

Results

Figure 2:
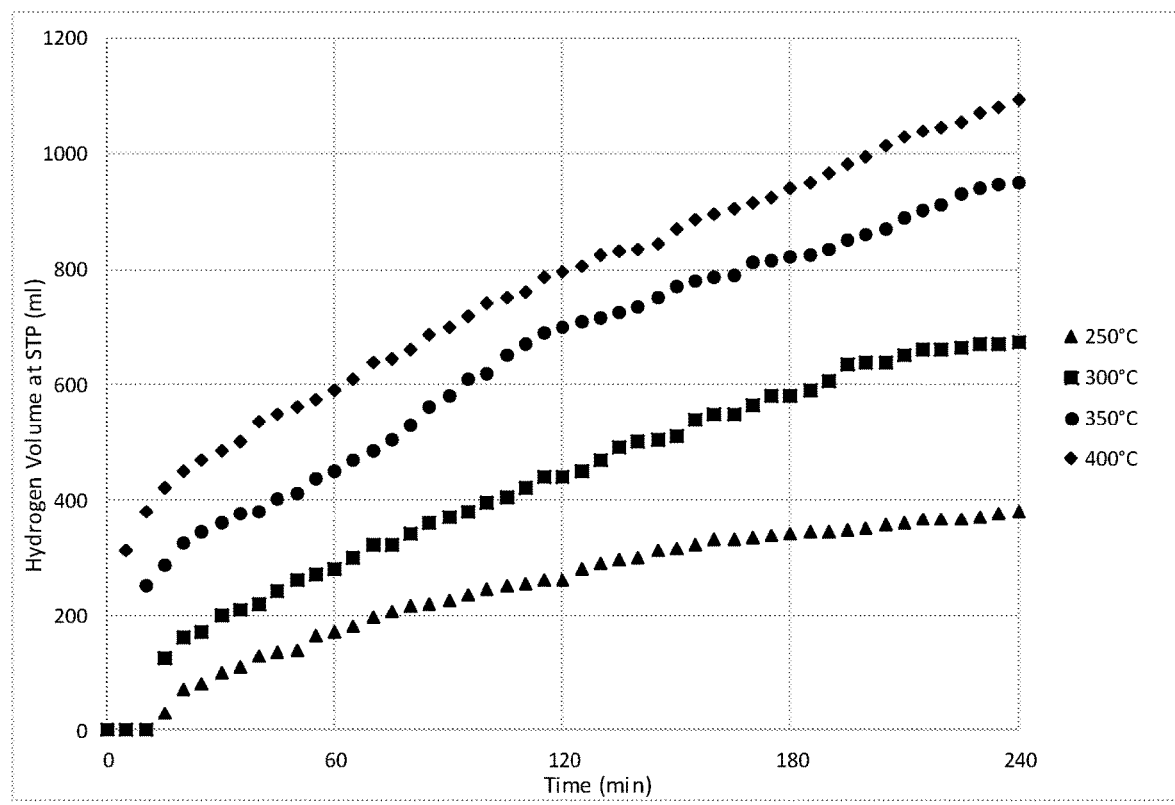
FIG. 2 is a graph showing the effect of temperature on the volume of hydrogen produced in a thermochemical reaction.

The effects of temperature were studied by measuring the hydrogen generation at four different temperatures, namely 250° C., 300° C., 350° C. and 400° C. All of the experiments were carried out using zinc powder at a steam flow rate of 150 ml/min. The results from the temperature experiments show that an increase in reaction temperature leads to an increase in the volume of hydrogen produced in the reaction, see FIG. 2. All of the different temperatures follow a similar shape of an initial rapid increase in hydrogen, followed by a decrease in the rate of production. The rate of production follows the general pattern that the higher the temperature the greater the rate of hydrogen generation. A further observation is that the higher the temperature the less the delay in hydrogen production after the water is injected into the system.

Figure 3:
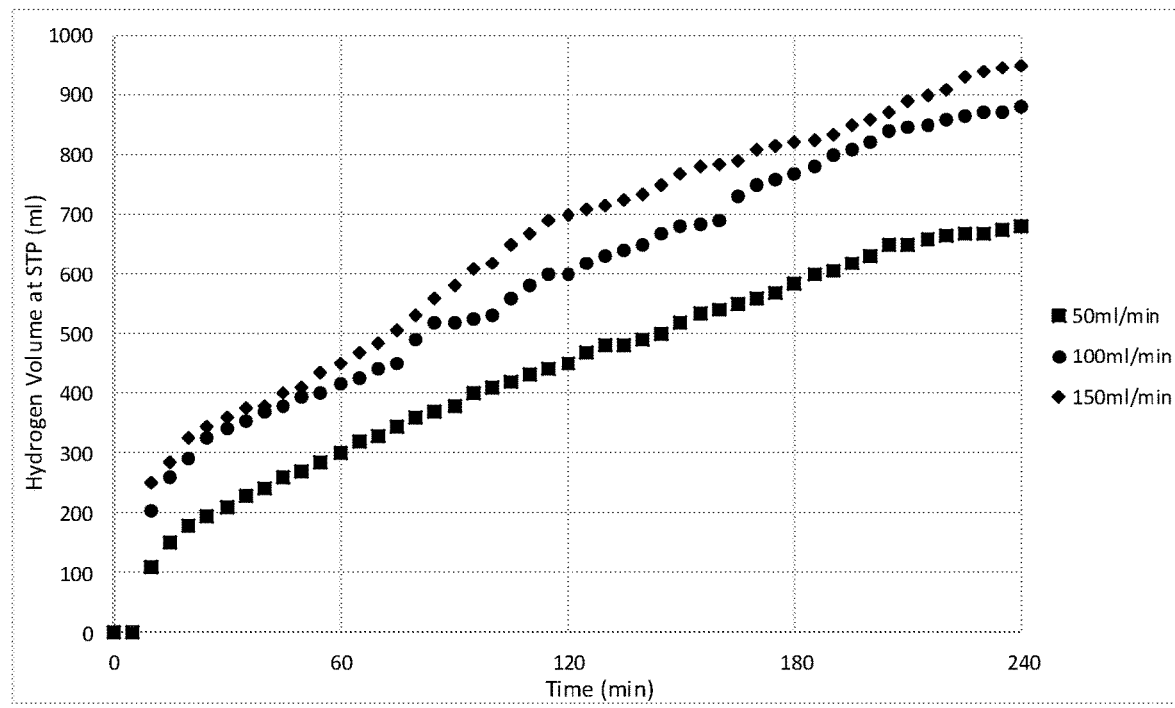
FIG. 3 is a graph showing the effect of steam flow rate on the volume of hydrogen produced in a thermochemical reaction.

The effects of steam volumetric flow rate were studied by measuring the hydrogen generation at three different rates of 50 ml/min, 100 ml/min and 150 ml/min. All of the experiments were carried out using zinc powder at a constant temperature of 350° C. The results show that an increase in steam volumetric flow leads to an increase in the volume of hydrogen produced, see FIG. 3. The results follow a pattern of rapid increase followed by a gradual decrease in hydrogen generation rate. The difference in rate and volume produced is less when compared to the effects of temperature. There is a consistent delay of 10 minutes before the start of the reaction after the water is injected into the system.

Figure 4:
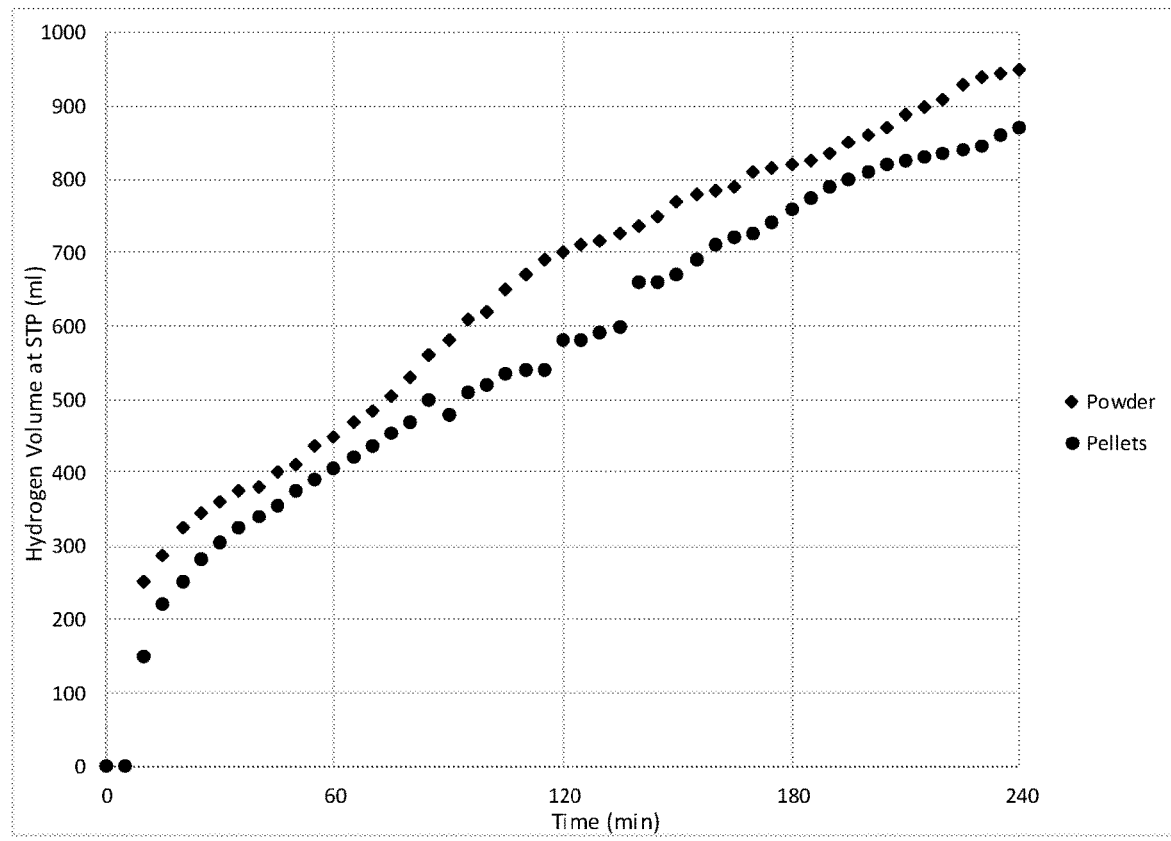
FIG. 4 is a graph showing the effect of the form of zinc on the volume of hydrogen produced in a thermochemical reaction.

The effects of the form of the zinc were studied by comparing the volume of hydrogen generated when the zinc was provided in the form of pellets compared to a powder. All of the experiments were carried out using a constant temperature of 350° C. and steam volumetric flow rate of 150 ml/min. The results show that zinc in the form of a powder produces more hydrogen than zinc in the form of pellets, see FIG. 4. At the end of the experiment the zinc samples were removed from the crucible. When removed the pellets were found to have broken up slightly and there were clumps of zinc surrounded by zinc powder that had broken off.

During the above experiments, channeling was observed in the crucible whereby steam would flow out of the crucible in specific areas by-passing large amounts of the zinc.

Figure 5:
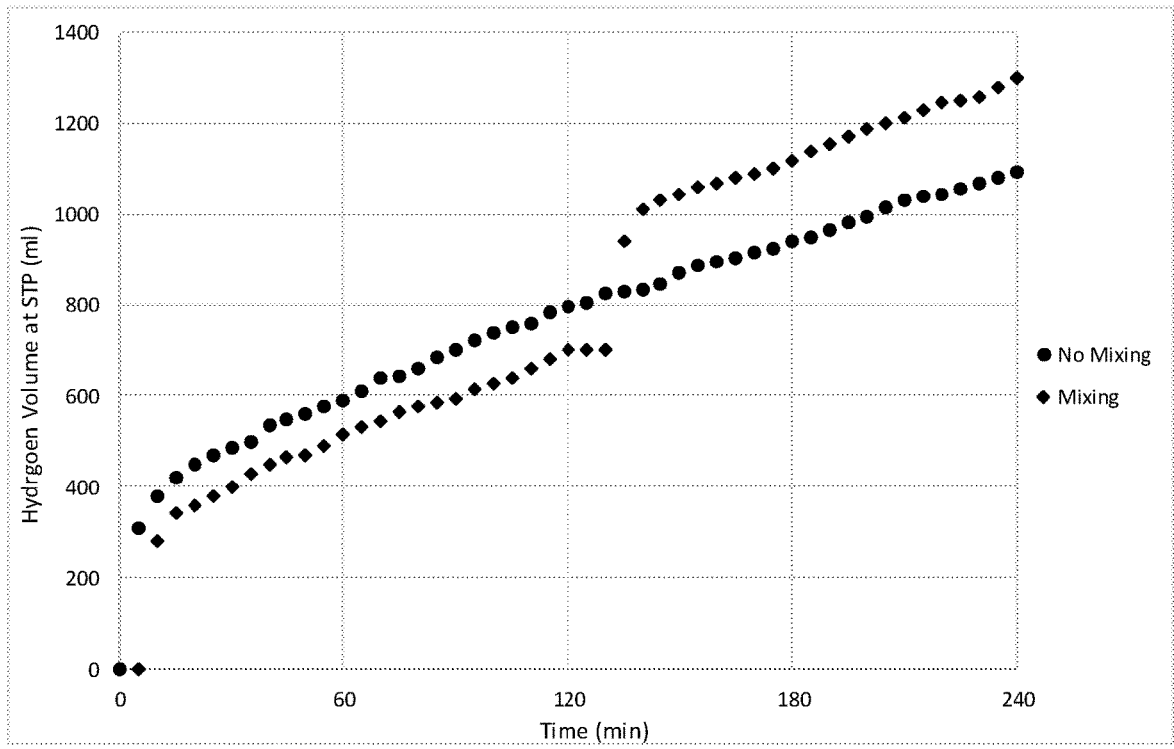
FIG. 5 is a graph showing the effect of mixing zinc on the volume of hydrogen produced in a thermochemical reaction.

Accordingly, some areas of the zinc sample were exposed to the steam while others were not. In order to assess how this channeling was impacting on the rate of reaction an experiment was carried out which involved removing the zinc sample and mixing it halfway through the experiment. The experiments were carried out using zinc powder at a constant temperature of 400° C. and steam volumetric flow rate of 150 ml/min. As would be expected, the initial reaction is similar for both experiments, but the volume of hydrogen produced jumps at the point where the zinc is mixed, see FIG. 5.

Figure 6:
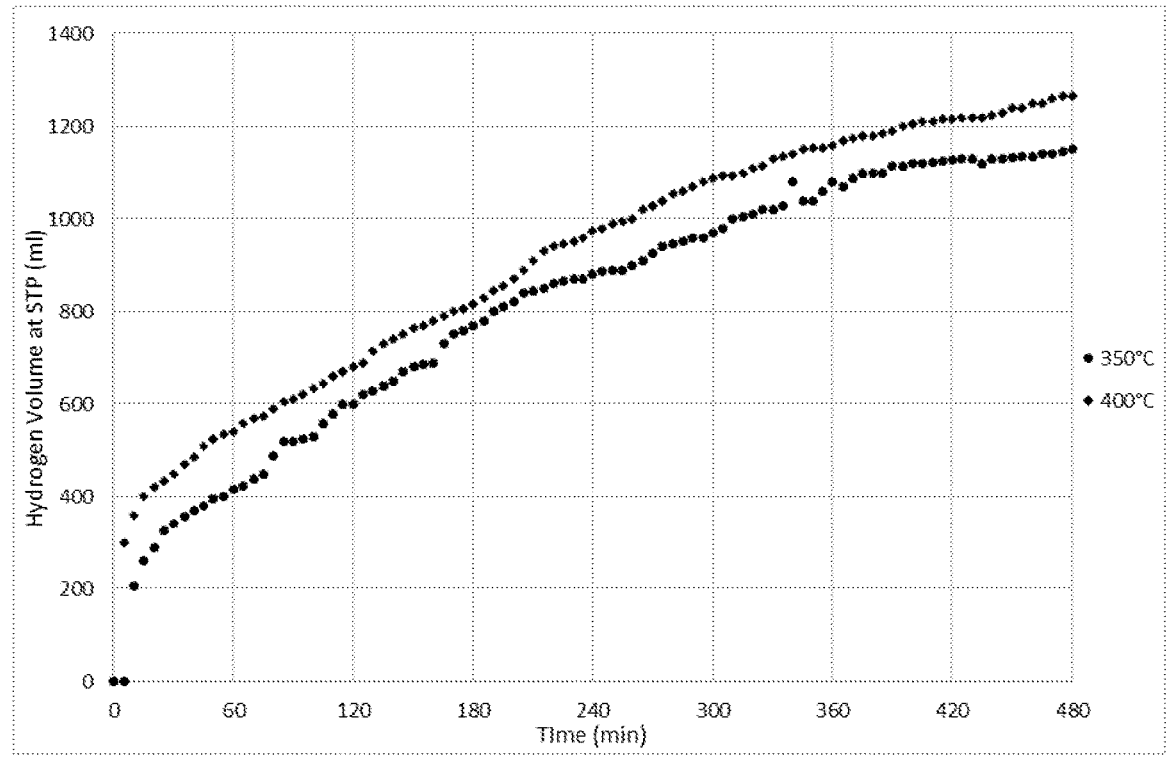
FIG. 6 is a graph showing the experiments hydrogen production in experiments which were run to completion.

To determine how long the reaction would take to complete, two experiments were run until hydrogen production ceased. The first experiment was carried out using zinc powder at 350° C. and a steam volumetric flow of 100 ml/min and run until the production plateaued, which occurred after approximately 8 hours, see FIG. 6. The second experiment was carried out using zinc powder at 400° C. and a steam volumetric flow of 150 ml/min. Similarly to the first experiment, it took approximately 8 hours for the hydrogen production to start levelling out, see FIG. 6.

EXAMPLE 2—ELECTROCHEMICAL REACTION OF ZINC OXIDE

Methods

Figure 7:
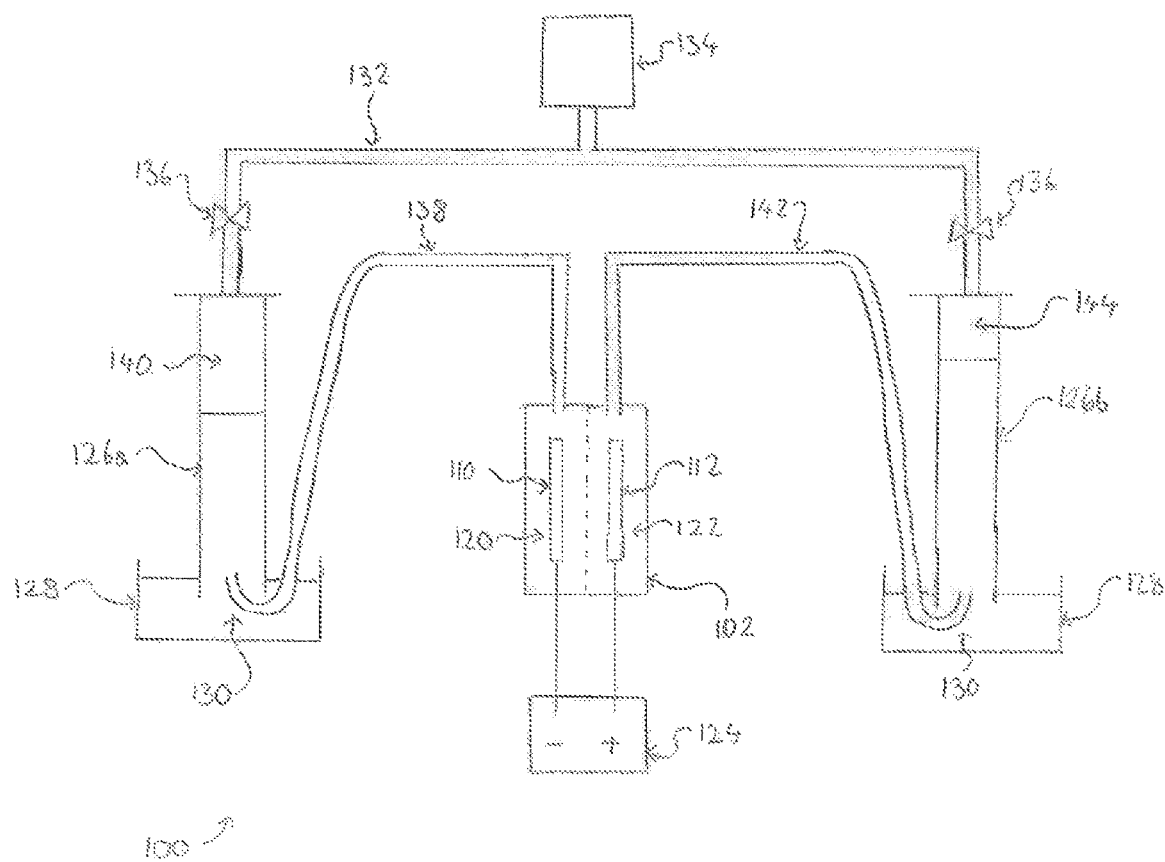
FIG. 7 is a schematic diagram of the experimental set-up for an electrolysis reaction.
Figure 8:
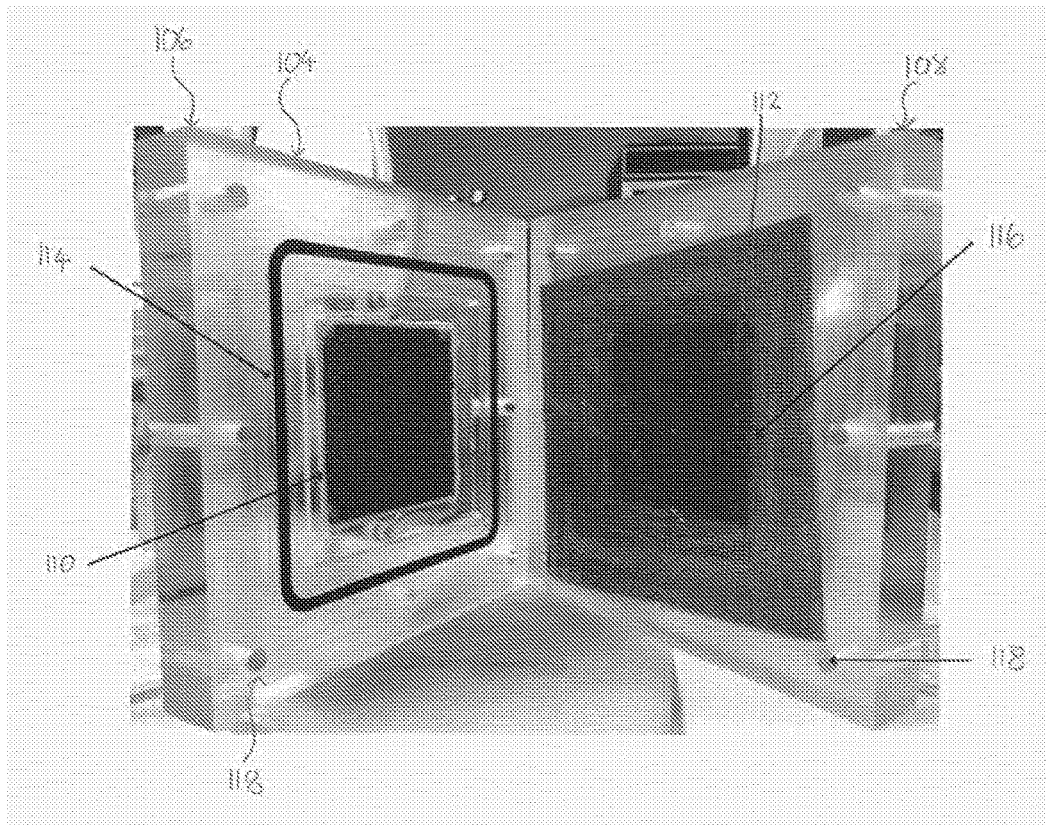
FIG. 8 shows the electrolysis cell using in the experimental set-up of FIG. 7.

The second experiment conducted was an electrochemical reaction using the apparatus 100 shown in FIG. 7. The apparatus 100 comprised an electrolysis cell 102 made by the University of Surrey Workshop. As shown in FIG. 8, the cell 102 comprised a Perspex™ housing 104 which was provided in two separate parts 106, 108. A cathode 110 was disposed in the first part 106 of the housing 104, and an anode 112 was disposed in the second part 108 of the housing 104. Both the cathode 110 and the anode 112 comprised a graphite plate.

A rubber O-ring 114 was disposed in the first part 106 of the housing 104, and surrounded the cathode. Prior to use, an anion exchange membrane 116 would be placed over the cathode 110 and O-ring 114, so that the edges of the membrane 116 extended over the O-ring 114. The second part 108 of the housing 104 would then be placed over the membrane 116 and the first and second parts 106, 108 of the housing would be fixed together by screwing bolts into the corresponding bolt holes 118 disposed in the first and second parts 106, 108 of the housing.

Using peristaltic pumps (not shown) sodium zincate 120 was circulated through the cathode 110 side of the cell 102 and sodium hydroxide 122 was circulated through the anode 112 side of the cell 102 throughout the experiment. Details describing the preparation of the sodium zincate 120 are provided below.

A conventional DC power supply 124 was used to apply power to the electrodes 110, 112.

Two measuring cylinders 126a, 126b were disposed inverted in baths 128 comprising water 130. Nylon tubing 132 was connected to the top of the cylinders 126, allowing them to be filled with the waster 130 using a vacuum pump 134 prior to the start of an experiment. Valves 136 could then be closed. Nylon tubing 138 extending between the cathode 110 side of the cell 102 and one of the measuring cylinders 126a is configured to carry hydrogen 140 produced in an experiment to the measuring cylinder 126a. Similarly, nylon tubing 142 extending between the anode 112 side of the cell 102 and one of the measuring cylinders 126b is configured to carry oxygen 144 produced in an experiment to the measuring cylinder 126b.

Results

Solubility Experiment Results

Before any electrolysis cell experiments could be carried out, the best electrolyte solution to use had to be determined.

Zinc oxide is insoluble in water. However, it will react with sodium hydroxide according to the following formula:

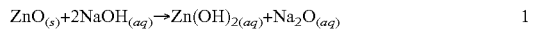

$$ZnO_{(s)} + 2NaOH_{(aq)} \rightarrow Zn(OH)_{2(aq)} + Na_2O_{(aq)} \qquad 1$$

The sodium oxide then reacts with the water like so:

$$Na_2O_{(aq)} + H_2O_{(l)} \rightarrow 2NaOH_{(aq)} \qquad 2$$

The excess NaOH that is available in the solution is used to dissolve the $Zn(OH)_2$ to form a pseudo compound which can be labelled as sodium zincate, $Na_2Zn(OH)_4$, like so:

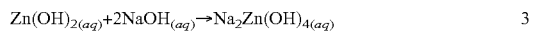

$$Zn(OH)_{2(aq)} + 2NaOH_{(aq)} \rightarrow Na_2Zn(OH)_{4(aq)} \qquad 3$$

In order to find the range of molarities of sodium zincate solution which could be made, the solubility of sodium hydroxide (NaOH) in water had to first be determined.

Experiments were carried out to find the maximum solubility of sodium hydroxide in water at room temperature. This was achieved by periodically adding sodium hydroxide to 100 ml of de-ionised water which was being continuously mixed by a magnetic stirrer. When the solution began going cloudy it was noted that dissolution had stopped.

As the dissolution of sodium hydroxide in water is exothermic an ice bath was used to keep the solution cool. Initially, sodium hydroxide pellets were added to the water in 10 g intervals, allowing the solution to cool between additions. Once the range of maximum solubility was found (in the range of 80 g-90 g) the solution could be re-made and smaller increments of sodium hydroxide added closer to the saturation point at room temperature.

It was found that a maximum mass of 82 g NaOH could be dissolved in 100 ml of water. The maximum found was less than in the literature (O'Neil, 2006) which states that 109 g can be dissolved in 100 ml of water at 20° C. To keep the solution contained and stop any water vapour escaping, Parafilm was used to cover the top of the beaker in-between the addition of sodium hydroxide pellets. However, some water droplets did form on underside of the film, which could have contributed to this discrepancy from the literature, as there was less water for the sodium hydroxide to dissolve in.

Figure 9:
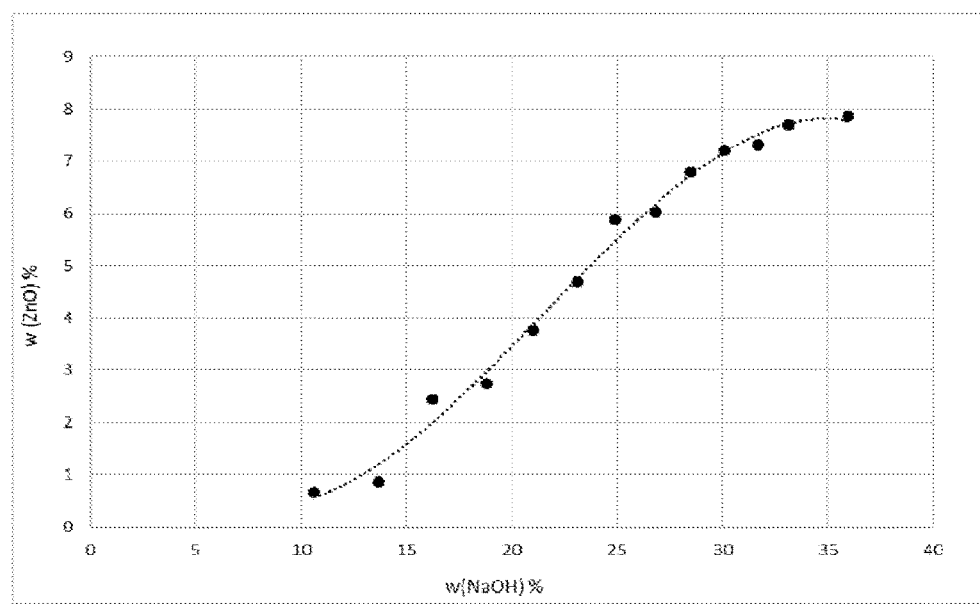
FIG. 9 is a graph showing the maximum solubility of zinc oxide (ZnO) in aqueous solutions comprising different concentrations of sodium hydroxide (NaOH)

To find the maximum solubility of zinc oxide in a sodium hydroxide solution a 1M NaOH solution was first created using 100 ml of water and 4 g NaOH. Then 0.5 g of ZnO was added and was left to mix for approximately 5 minutes. If it dissolved, another 0.5 g of ZnO was added, if it didn't 4 more grams of NaOH was added to the solution. This method was carried out until no more ZnO dissolved, despite adding more NaOH to the solution, and the results are shown in FIG. 9. The maximum solubility of zinc oxide was found to be 14 g in a solution containing 100 ml of water and 64 g of NaOH (to create a 1.78M sodium zincate solution). The graph shows that as more NaOH is added to the solution more zinc oxide can react and the sodium zincate can dissolve in solution. However, as shown in FIG. 9, as the solution reaches 30 wt % NaOH, the percentage of zinc oxide that reacts and dissolves increases more slowly and then levels off at just under 8 w % ZnO.

Conductivity Experiment Results

Sodium zincate solutions were prepared by adding either 12 g, 16 g, 20 g or 24 g of NaOH, and the required quantity of ZnO, to 100 ml deionised water. The solution was left to dissolve for between 5-10 minutes until it was clear, and the conductivity was then measured by using a Mettler Toledo conductivity probe. All readings were calibrated to 20° C. to keep results consistent and directly comparable. The conductivity probe was rinsed with D.I. water after the reading was complete to remove any sodium zincate solution, and left in D.I. water between readings to avoid contamination.

Figure 10:
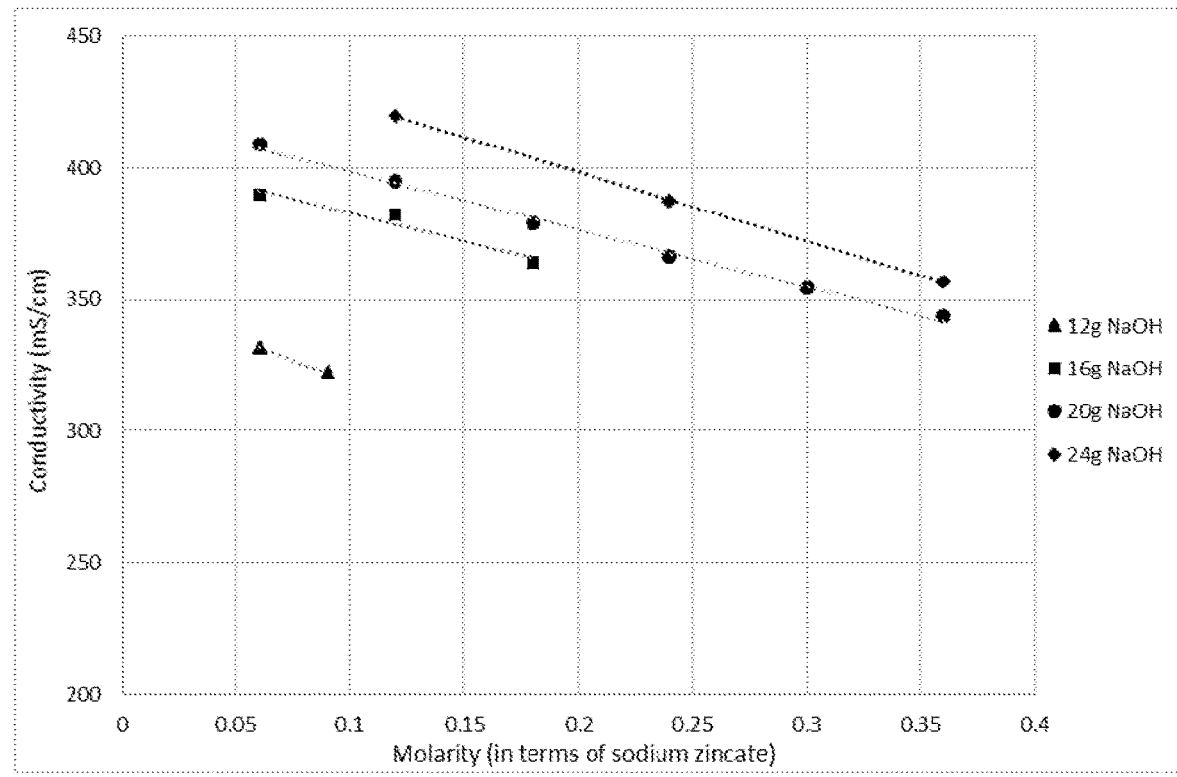
FIG. 10 is a graph showing how the conductivity of a sodium zincate solution varies with the concentration of sodium zincate and sodium hydroxide.

As shown in FIG. 10, as the molarity of the sodium zincate decreases the conductivity increases. Furthermore, increasing the concentration of NaOH increases the conductivity of the solution. Based on these results, a solution containing 100 ml water, 16 g NaOH and 1 g ZnO (0.12M) was chosen to scale up into a litre solution for use as the electrolyte in the cathode side of the cell. It may be appreciated that higher concentrations of NaOH could be used if a solution with higher conductivity was desired.

Figure 11:
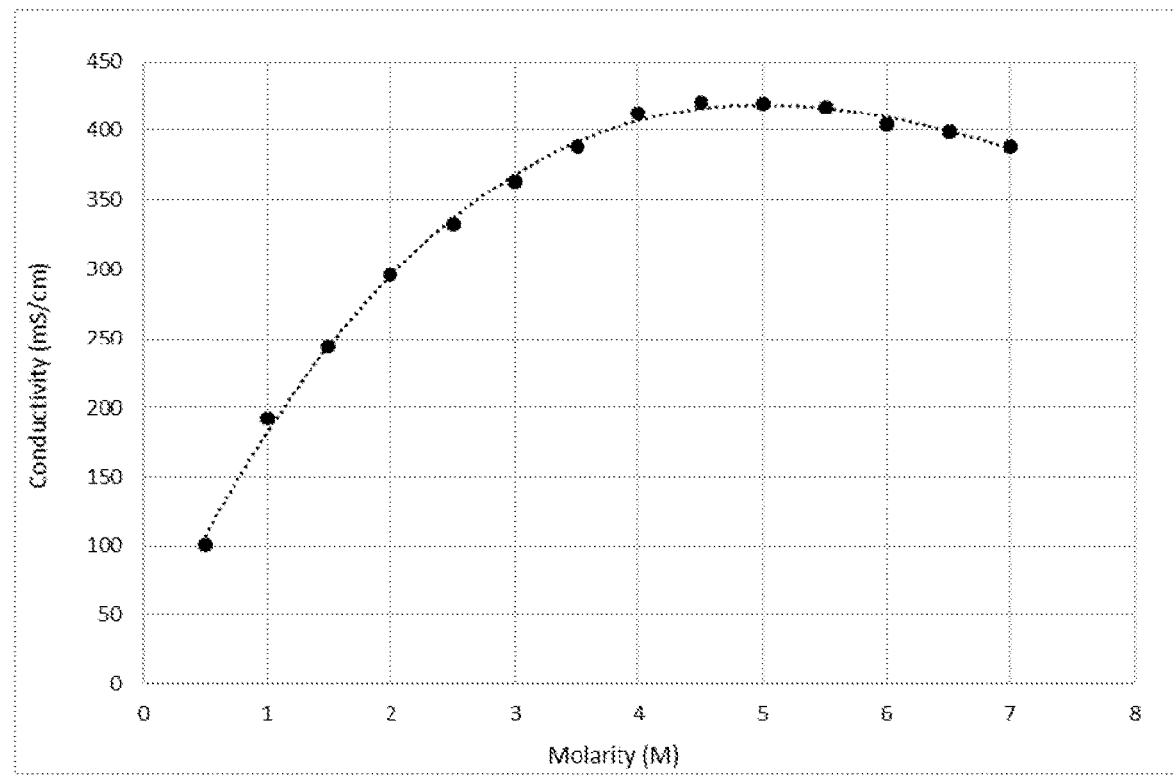
FIG. 11 is a graph showing how the conductivity of a sodium hydroxide solution varies with the concentration of sodium hydroxide.

The conductivity of sodium hydroxide also needed to be measured to decide which sodium hydroxide solution had the best conductivity and therefore would provide the best performance for the cell. Sodium hydroxide solutions between 0.5M and 7M were prepared and the conductivity was measured. As shown in FIG. 11, the inventors observed an increase in conductive with increasing molarity until reaching a peak at 4.5M when the conductivity begins to deteriorate. Accordingly, the concentration of sodium hydroxide in the electrolyte for the anode side was selected to be 4.5M, as it gave the highest conductivity.

Cell Experiment Results

Sodium zincate ($Na_2Zn(OH)_4$) solution is electrolytically decomposed in the cell by evolving hydrogen gas along with simultaneously electrodepositing zinc particles on the surface of cathode, and also evolving oxygen gas in the anode as described in the following anode-cathode summary reaction:

$$Na_2Zn(OH)_{4(aq)} \rightarrow 2NaOH + Zn + H_2 + O_2 \quad \quad 3a$$

Figure 12:
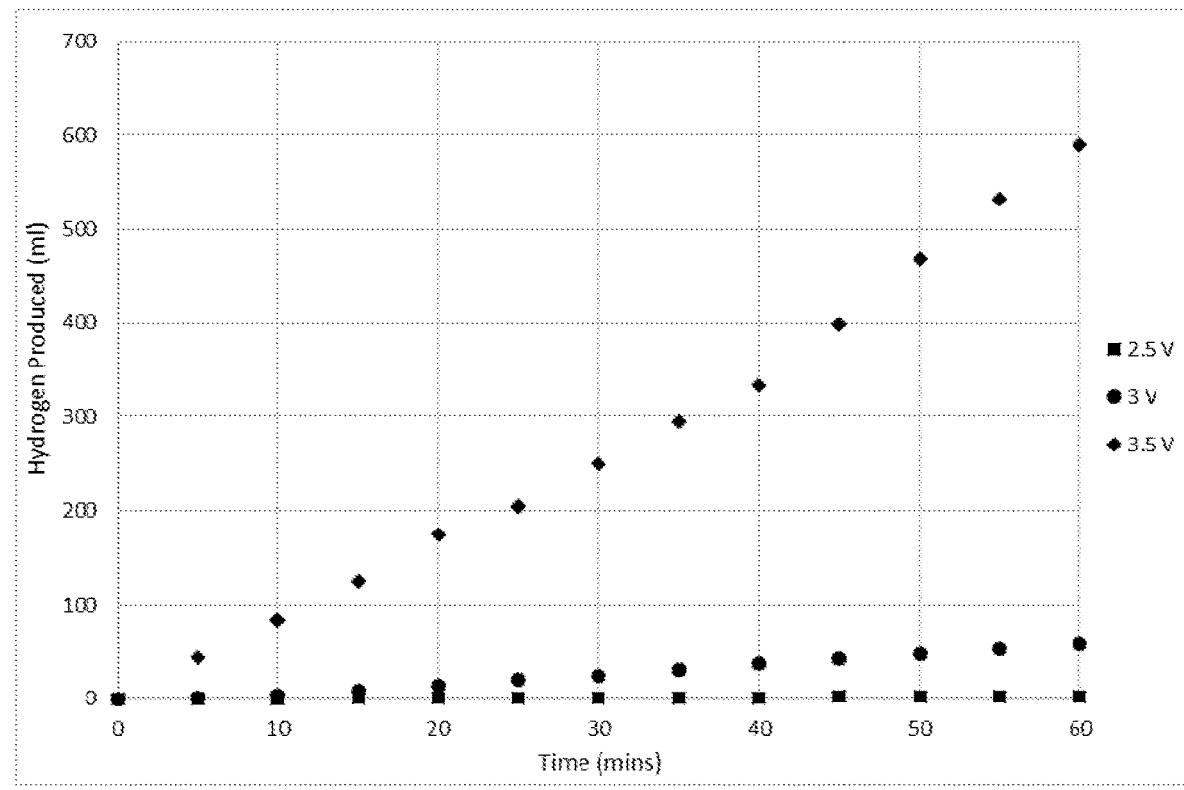
FIG. 12 is a graph showing how the voltage applied across electrodes affects the volume of hydrogen produced.

The effects of voltage on hydrogen production were studied using voltages of 2.5V, 3.0V and 3.5V. As shown in FIG. 12, as the voltage is increased the amount of hydrogen produced also increases. From 2.5V to 3V only a small increase in hydrogen production occurred.

Figure 13:
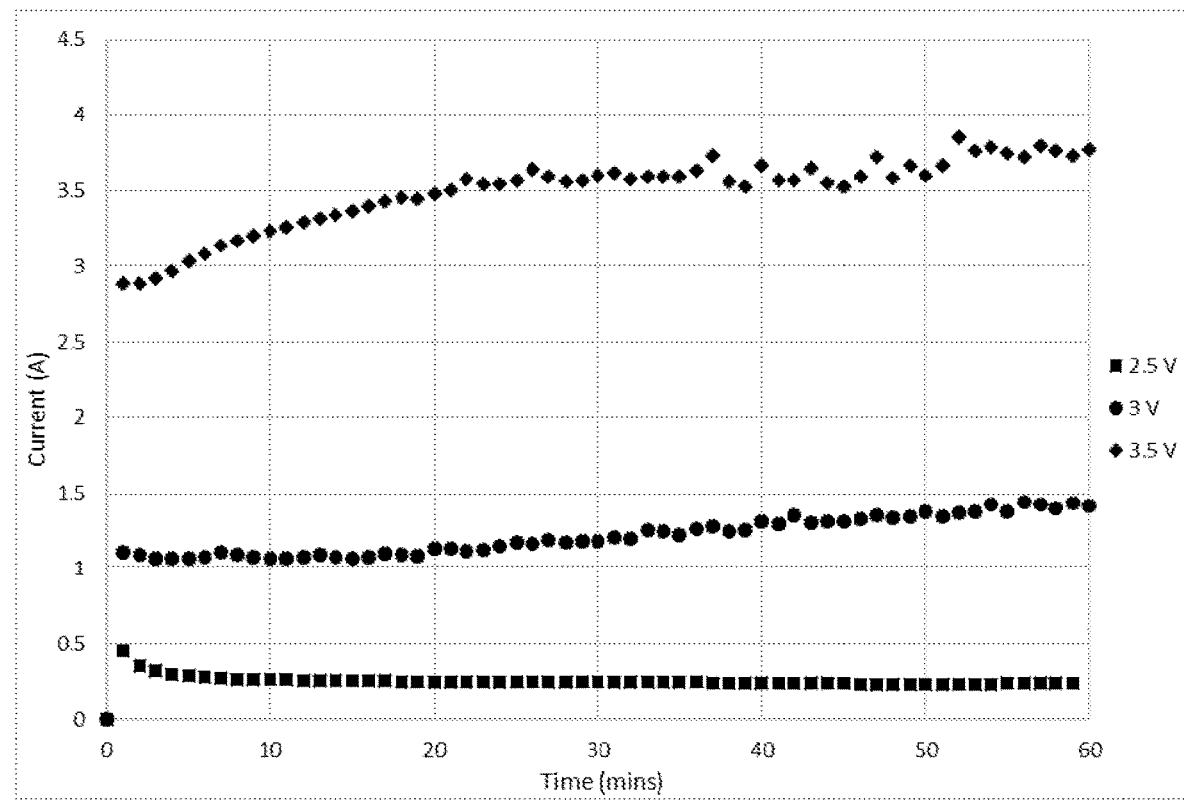
FIG. 13 is a graph showing how the voltage applied across electrodes affects the current.

The effects of voltage on the current in the cell were studied for the three different voltages: 2.5V, 3.0V and 3.5V, and the results are shown in FIG. 13. The results show that as the voltage is increased the current increased. The pattern for the 2.5V experiments shows an initial decrease in current with time which then stabilises, giving an average current of 0.25 A. The current in the 3V experiment remained level at first but then slowly increased to almost 1.5 A, with an average current over the experiment being recorded as 1.22 A. The 3.5V experiment had an initial rapid rise, then continued to slowly rise with respect to time, giving an average current of 3.51 A.

The zinc produced in the above experiments was recovered from the electrode surface. Further experiments were run varying the various experimental parameters, and the results are shown in table 1.

TABLE 1

Mass of zinc recovered from various electrolysis experiments

| Experiment | Voltage/ V | Electrolyte on cathode side | | Experiment duration/ mins | Mass of zinc recovered/ g |
| | | Molarity of sodium zincate/ M | Molarity of sodium hydroxide/ M | | |
| --- | --- | --- | --- | --- | --- |
| 1 | 2.5 | 0.12 | 3.0 | 60 | 0.21 |
| 2 | 3.0 | 0.12 | 3.0 | 60 | 1.83 |
| 3 | 3.5 | 0.12 | 3.0 | 60 | 3.44 |
| 4 | 5.0 | 0.06 | 3.0 | 120 | 4.48 |
| 5 | 4.1 | 0.06 | 3.0 | 65 | 2.47 |
| 6 | 2.4 | 0.06 | 3.0 | 120 | 0.42 |
| 7 | 2.5 | 0.06 | 3.0 | 120 | 0.85 |
| 8 | 2.8 | 0.06 | 3.0 | 120 | 1.11 |
| 9 | 2.8 | 0.06 | 4.5 | 120 | 1.47 |
| 10 | 2.5 | 0.06 | 3.0 | 120 | 0.84 |
| 11 | 2.8 | 0.09 | 3.0 | 120 | 1.82 |

As shown in table 1, the higher the voltage, and therefore the current, the greater the amount of zinc recovery. Comparing experiments 8 and 9, it is noted that increasing the concentration of the sodium zincate solution increases the mass of zinc recovered. It was noted that the current increased at a faster rate in experiment 9 and reached an overall higher current than in experiment 8. It is thought that this is due to the increased conductivity of the electrolyte, and led to the increased mass of zinc.

The cell efficiencies for experiments 1 to 3 were calculated so their performance could be compared, and the results are shown in table 2.

TABLE 2

Cell efficiencies for experiments 1 to 3

| Experiment | Hydrogen produced/ cm³ | Volume of cell/ cm³ | Hydrogen production rate per unit volume/ hr⁻¹ | Voltage/ V | Current/ A | Cell Efficiency |
| --- | --- | --- | --- | --- | --- | --- |
| 1 | 2 | 2000 | 0.001 | 2.5 | 0.2504 | 1.60 |
| 2 | 59 | 2000 | 0.0295 | 3.0 | 1.225 | 8.03 |
| 3 | 590 | 2000 | 0.295 | 3.5 | 3.515 | 23.98 |

The trend shows that as the voltage increased and more hydrogen is produced, the cell efficiency increases.

EXAMPLE 3—ELECTROCHEMICAL REACTION OF SODIUM STANNATE

To show that the method was applicable for use with metals other than zinc, the inventors also investigated the electrochemical reaction of sodium stannate.

Method

Apparatus

An undivided electrolysis cell, was used to carry out the batch experiments. The cell comprised of a rectangular, open top perspex acrylic vessel with two cylindrical graphite electrodes disposed 6 cm apart and connected to the bottom of the vessel. The vessel had a height of 25 cm, a length of 20 cm, and a width of 12 cm. The part of the electrode which remained inside the vessel had a length of 3 cm and a diameter of 1 cm. Electric wires connected the electrodes to the power supply. The power supply set the voltage (and current) prior to each experiment. Each electrode had a cylinder (500 ml) with fitted valves placed over it. Tubing was used to connect one the cylinders to the vacuum pump, which was used to fill the cylinders with electrolyte solution prior to the start of the experiments. The valves were then closed prior to the start of the experiment.

Electrical Conductivity

The electrolyte was prepared by dissolving 55.4 g of sodium stannate (42-45% $SnO_2$ basis), into 200 ml of distilled water. The solution produced had a concentration of 1.3M. This concentration was determined based on sodium stannate's solubility limit in water. The reaction which occurred was exothermic:

$$Na_2SnO_{3(s)} + 3H_2O \leftrightarrow Na_2[Sn(OH)_6]_{(aq)} \quad \quad 4$$

The electrical conductivity of the electrolyte was measured using a conductivity measuring device. Then the solution was diluted with the addition of distilled water to the desired concentrations. These ranged from 1.3-0.1M, decreasing by 0.1M, at each interval. The conductivity was measured at every concentration. Using, the conductivity, the resistance was calculated using the following equation:

$$R = L/\sigma \cdot S \quad \quad 5$$

where R is electrical resistance (Ω), σ is electrical conductivity (mS/cm), L is the distance between the electrodes (cm) and S is the electrode surface area (cm²). In this experiment, the electrode surface area was fixed at 11 cm².

Hydrogen Production

Once electrolyte had been produced with the desired concentration, as described above, it was mixed thoroughly to ensure a constant concentration gradient. It was then poured carefully into the reaction vessel and the power supply was turned on. The current was fixed at 1 A for all experiments.

Two different experimental procedures were carried out. The first experimental procedure involved measuring the hydrogen production rate, over time, at three different concentrations of electrolyte around the optimum. The optimum concentrations were determined from the results of the electrical conductivity measurements. The second experimental procedure involved measuring the hydrogen production rate, over time, at three different voltages: 2, 2.5, and 3V. Each experiment lasted for three hours, with the hydrogen production rates measured at five minute intervals.

The electrolysis which is desirable is that of sodium stannate trihydrate. However, it can exist in equilibrium with tin (IV) hydroxide and NaOH, as shown below:

$$Na_2[Sn(OH)_6]_{(aq)} \leftrightarrow 2NaOH_{(aq)} + Sn(OH)_4_{(aq)} \qquad 6$$

The process was carried out at room temperature, which is beneficial as it tends to favour the formation of sodium stannate trihydrate at equilibrium. Even though the dissociation of water is relatively small in this process, it is still possible. It will lead to the production of hydrogen gas at the cathode. However, the more prominent reaction which occurs at the same time is the reduction of tin(IV) hydroxide to tin. The metal deposits on the surface of the cathode. These reactions can be seen respectively as:

$$4H_2O_{(l)} + 4e^- \leftrightarrow 2H_{2(g)} + 4OH^-_{(aq)} \qquad 7$$

$$Sn(OH)_{4(aq)} + 4e^- \leftrightarrow Sn_{(s)} + 4OH^-_{(aq)} \qquad 8$$

The reaction at the anode involves the production of oxygen gas:

$$8OH^-_{(aq)} \leftrightarrow 2O_{2(g)} + 4H_2O_{(l)} + 8e^- \qquad 9$$

The summation of equations 6 to 9 simplifies to:

$$Na_2[Sn(OH)_6]_{(aq)} \leftrightarrow 2NaOH_{(aq)} + Sn_{(s)} + 2H_{2(g)} + 2O_{2(g)} \qquad 10$$

The tin deposited on the cathode can then be oxidised to produce tin (IV) hydroxide and hydrogen gas. It will be appreciated that this process could be carried out using the apparatus described in example 1. The equation for this reaction is:

$$Sn_{(s)} + 4H_2O_{(l)} \leftrightarrow Sn(OH)_{4(aq)} + 2H_{2(g)} \qquad 11$$

The tin (IV) hydroxide produced can be used to replace the sodium stannate trihydrate which has reacted according to equation 6. By taking the summation of equations 10 and 11, the overall equation used to represent the process can simplify to:

$$4H_2O \leftrightarrow 4H_{2(g)} + 2O_{2(g)} \qquad 12$$

Cell Efficiency

The Cell Efficiency was Calculated Based on a Combination of Measurements Taken from the Experiments and Parameters Used to Conduct the Experiments. The Equation Used to Determine the Cell Efficiency was:

$$n = q/(U \cdot I \cdot t) \qquad 13$$

where n is the cell efficiency based on the hydrogen production rate [$m^3 \, m^{-3} \, h^{-1} \, (kWh)^{-1}$], q is the hydrogen production rate per unit volume of electrolyte in electrolysis cell ($m^3 \, m^{-3} \, h^{-1}$), U is the cell voltage (V), I is the cell current (A) and t is time (hours).

The term $(kWh)^{-1}$, is a combination of the terms in the denominator of equation 10. It is a representation of the amount of power consumed by electrolysis.

During these experiments, the voltage varies (2, 2.5, and 3V) with a fixed electrolyte concentration, current and specified time.

Results and Discussion

Concentration and Conductivity

Figure 15:
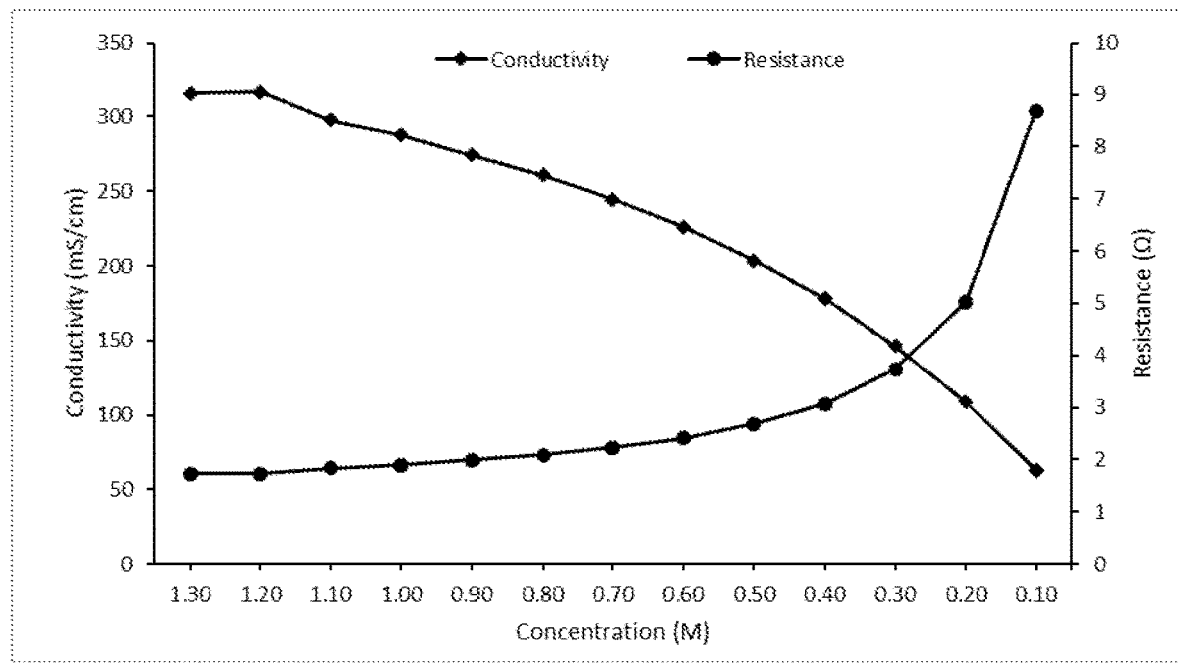
FIG. 15 is a graph showing how the conductivity and resistance of a sodium stannate trihydate solution varies with the concentration of sodium stannate trihydate.

As explained above, the conductivity of the electrolyte was measured at various concentrations. As shown in FIG. 15, a decrease in the concentration of the electrolyte leads to a decrease in the conductivity. This is because the number of ions per unit volume decreases as the concentration decreases. Therefore, there are fewer ions to carry the electrical charge per unit volume, which results in a decrease in conductivity. Based on this fact, it is expected that the electrolyte concentration of 1.3M, the maximum concentration used in the experiment, will have the highest conductivity. However, this was not the case. The optimum conductivity was at a concentration of 1.2M. The unexpected results could be explained by the electrolyte being at its solubility limit.

Additionally, the relationship between resistance and conductivity is reciprocal.

Concentration and Hydrogen Production

Concentrations of 1.1 M, 1.2 M and 1.3 M sodium stannate trihydrate were chosen based on these electrolytes having the highest conductivities. The hydrogen production for these electrolytes was then measured.

Figure 16:
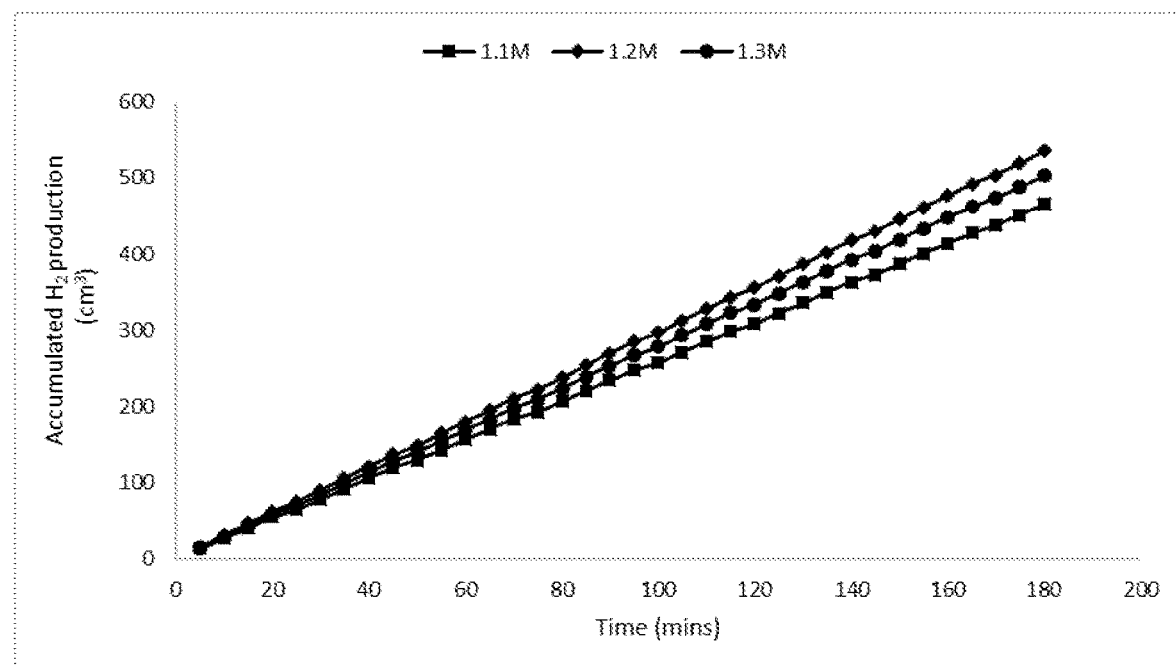
FIG. 16 is a graph showing hydrogen production against time for different concentrations of sodium stannate trihydate where the voltage applied was 2 V.

The greatest yield of hydrogen was measured for the 1.2M electrolyte, see FIG. 16. Accordingly, the electrolyte with the highest conductivity produced the most hydrogen in a given time.

Voltage and Hydrogen Production

Figure 17:
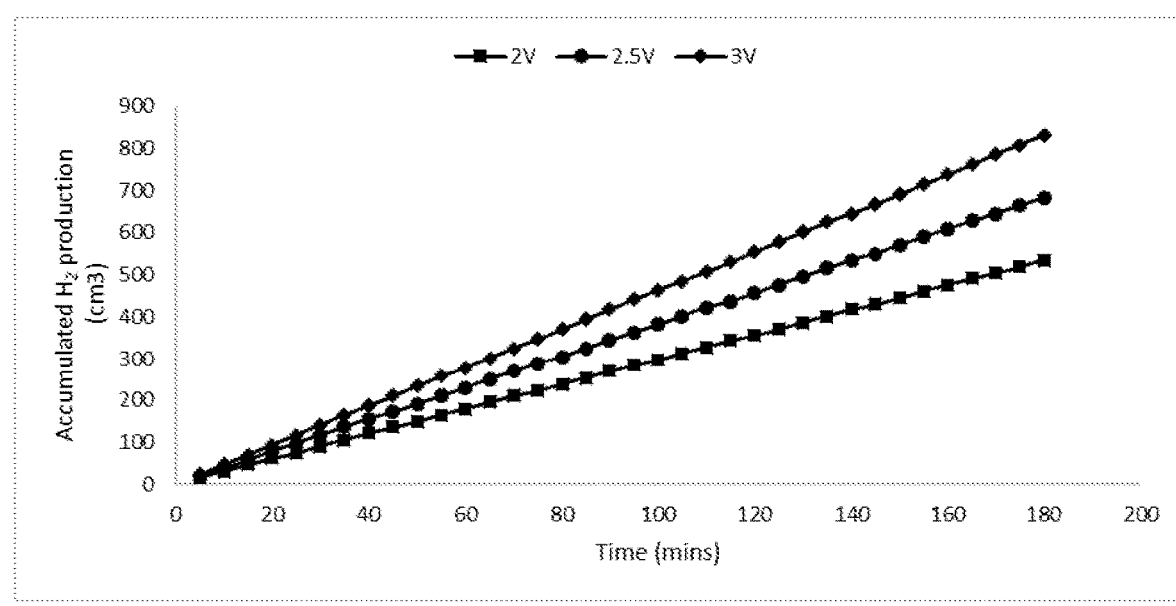
FIG. 17 is a graph showing hydrogen production against time for the 1.2 M electrolyte where the voltage applied was varied.

The three voltages considered in FIG. 17 were chosen based on the minimum cell voltage used in water electrolysis for hydrogen production, which was 2V. The hydrogen production was then measured.

The most amount of hydrogen accumulated was when the voltage was at its highest, i.e. 3V. This is expected since a larger voltage accelerates the rate at which electrolysis occurs, which leads to more ions flowing to the electrodes. Hence, more hydrogen accumulated over time. Comparing this to FIG. 16, it can be seen that voltage has a more significant effect on hydrogen production than concentration. The difference in the hydrogen production rate between 2V and 2.5V was approximately 150 cm³. This is a substantial change in hydrogen accumulated based on the scale of production for the relative change in voltage.

Cell Efficiency

The cell efficiency was calculated based on a 1.2M electrolyte solution, and the results are provided in table 3.

TABLE 3

| The cell efficiency for a 1.2M electrolyte solution ||
| Voltage (V) | Cell efficiency [$m^3 m^{-3} h^{-1} \, (kWh)^{-1}$] |
| --- | --- |
| 2 | 10.68 |
| 2.5 | 4.35 |
| 3 | 2.03 |

The first observation made is an increase in voltage leads to a decrease in cell efficiency. Even though it gives a more considerable amount of hydrogen produced, the cell is less efficient, which is undesirable. Based upon these results, a cell using sodium zincate (discussed in example 2) is considered to be more efficient. However, it is hard to make a direct comparison because the amount of electrical power consumed during the electrolysis experiment was not the same. Therefore, this will lead to some discrepancies in the results.

It appears that there is a significant drop-off in efficiency in the range 2-2.5V compared to 2.5-3V. For this reason, it would be more efficient to use smaller voltages, as this is when the cells are the most efficient. Nevertheless, at lower voltages, i.e. 2V it is apparent the cell is more efficient than a water electrolyser which could be as a result of the ionic activator in the electrolyte solution.

CONCLUSION

Figure 14:
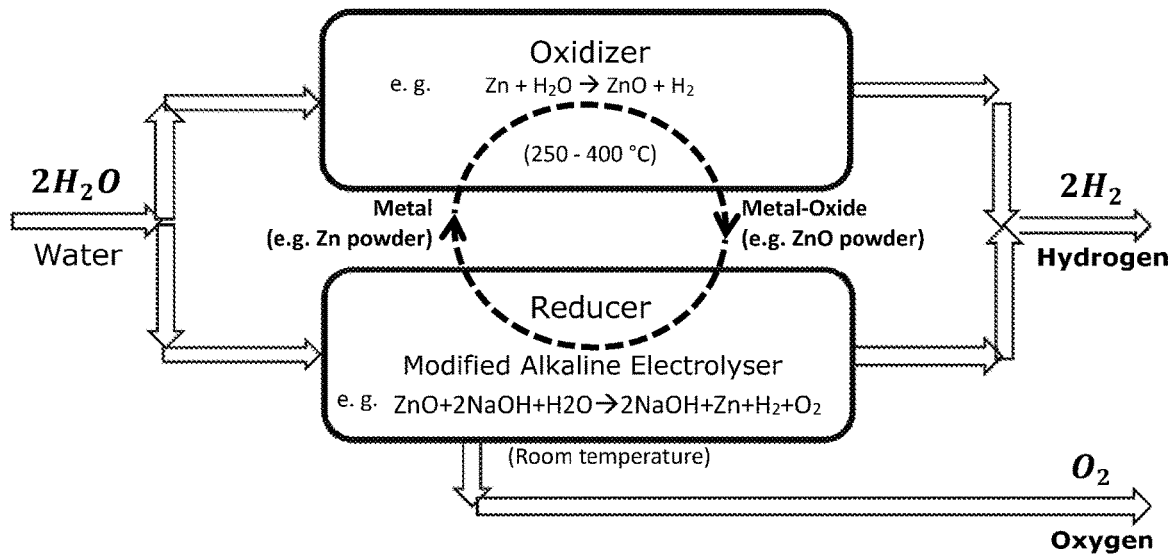
FIG. 14 is a schematic diagram showing the cyclic nature of the overall process.

The inventors have shown that it is possible to generate hydrogen gas by converting zinc to zinc oxide in a thermochemical reaction, and to generate further hydrogen gas by converting zinc oxide to zinc in an electrochemical reaction. Accordingly, once an initial quantity of zinc/zinc oxide has been provided, it is possible to run these reactions in a cycle, as shown in FIG. 14, to generate large amounts of hydrogen gas where the only feedstock required is water.

The inventors have shown that this system can also be applied to other metals, such as tin. In particular, the inventors have produced tin from sodium stannate in an electrolysis reaction.

The invention claimed is:

1. A method of producing hydrogen, the method comprising:
   conducting a thermochemical reaction by contacting zinc or tin, or an alloy thereof, wherein the zinc or tin, or the alloy thereof, is a solid; with steam to produce zinc oxide and/or zinc hydroxide or tin oxide and/or tin hydroxide and hydrogen;
   contacting the zinc oxide and/or zinc hydroxide or the tin oxide and/or tin hydroxide produced in the thermochemical reaction with water or a basic aqueous solution to produce a solution comprising a zinc ion or a tin ion; and
   conducting an electrochemical reaction by applying a voltage across an anode and a cathode, wherein the voltage is applied by a power supply and whereby at least a portion of the cathode contacts the solution comprising the zinc ion or the tin ion, to simultaneously produce hydrogen and the zinc or tin, or the alloy thereof at the cathode and to produce oxygen at the anode.

2. A method of producing hydrogen, the method comprising:
   contacting zinc oxide and/or zinc hydroxide or tin oxide and/or tin hydroxide with water or a basic aqueous solution to produce a solution comprising a zinc ion or a tin ion;
   conducting an electrochemical reaction by applying a voltage across an anode and a cathode, wherein the voltage is applied by a power supply and whereby at least a portion of the cathode contacts the solution comprising the zinc ion or the tin ion, to simultaneously produce hydrogen and zinc or tin, or an alloy thereof, at the cathode and to produce oxygen at the anode; and
   conducting a thermochemical reaction by contacting the zinc or tin, or the alloy thereof, produced in the electrochemical reaction, wherein the zinc or tin, or the alloy thereof, is a solid; with steam to produce the zinc oxide and/or zinc hydroxide or tin oxide and/or tin hydroxide and hydrogen.

3. The method according to claim 1, wherein the electrochemical reaction is conducted repeatedly, or continuously.

4. The method according to claim 1, wherein the thermochemical reaction is conducted continuously, or repeatedly.

5. The method according to claim 1, wherein the zinc or tin, or the alloy thereof, is contacted with the steam at a temperature of between 100° C. and 700° C.

6. The method according to claim 1, wherein the method comprises agitating the zinc or tin, or the alloy thereof, while it is being contacted with the steam.

7. The method according to claim 1, wherein the method comprises condensing unreacted steam from a gaseous mixture obtained from the thermochemical reaction.

8. The method according to claim 1, wherein the method comprises contacting the zinc oxide and/or zinc hydroxide or tin oxide and/or tin hydroxide with the basic aqueous solution and the basic aqueous solution comprises a base, and the base is an Arrhenius base, a Lewis base, or a Bronsted-Lowry base, optionally wherein the base is an Arrhenius base and comprises an alkali metal or alkaline earth metal hydroxide.

9. The method according to claim 1, wherein the method comprises contacting the zinc oxide and/or zinc hydroxide or tin oxide and/or tin hydroxide with the basic aqueous solution, and the basic aqueous solution comprises a concentration of between 0.5 and 8.5 M of a base.

10. The method according to claim 1, wherein the method comprises contacting the zinc oxide and/or zinc hydroxide or tin oxide and/or tin hydroxide with the basic aqueous solution, and the zinc oxide and/or zinc hydroxide or tin oxide and/or tin hydroxide is contacted with the basic aqueous solution in a sufficient quantity to produce the solution comprising the zinc or tin ion, wherein the zinc or tin ion is present at a concentration of between 0.001 and 1 M.

11. The method according to claim 1, wherein the method comprises contacting the zinc oxide and/or zinc hydroxide or tin oxide and/or tin hydroxide with water, and the zinc oxide and/or zinc hydroxide or tin oxide and/or tin hydroxide is contacted with water in a sufficient quantity to produce the solution comprising the zinc or tin ion, wherein the zinc or tin ion is present at a concentration of between 0.2 and 5 M.

12. The method according to claim 1, wherein the anode and the cathode are disposed in an undivided electrochemical cell.

13. The method according to claim 1, wherein the anode and the cathode are disposed in an electrochemical cell, and the electrochemical cell comprises a membrane disposed between the anode and the cathode dividing the cell into two portions.

14. The method according to claim 13, wherein the method comprises disposing the solution comprising the zinc or tin ion in a cathode portion of the cell, such that at least a portion of the cathode contacts the solution comprising the zinc or tin ion and the method further comprises disposing a further electrolyte in an anode portion of the cell, such that at least a portion of the anode contacts the further electrolyte, optionally wherein the further electrolyte comprises a basic aqueous solution.

15. The method according to claim 1, wherein the method comprises applying a voltage of between 1 and 5 V across the anode and cathode.

16. The method according to claim 1, wherein the method comprises causing a current of between 0.5 and 4 A to flow through the anode, cathode and the solution comprising the zinc or tin ion.

17. The method according to claim 1, wherein the zinc or tin, or the alloy thereof, comprises a powder, pellets, or flakes.

18. The method according to claim 1, wherein the zinc or tin, or the alloy thereof, is contacted with the steam at a pressure of between 2,000 and 30,000 kPa.

* * * * *